United States Patent [19]

Widergren et al.

[11] 4,302,775

[45] Nov. 24, 1981

[54] DIGITAL VIDEO COMPRESSION SYSTEM AND METHODS UTILIZING SCENE ADAPTIVE CODING WITH RATE BUFFER FEEDBACK

[75] Inventors: Robert D. Widergren, Saratoga; Wen-Hsiung Chen, Sunnyvale; Stanley C. Fralick, Saratoga; Andrew G. Tescher, Claremont, all of Calif.

[73] Assignee: Compression Labs, Inc., San Jose, Calif.

[21] Appl. No.: 969,991

[22] Filed: Dec. 15, 1978

[51] Int. Cl.³ .................. H04N 7/12; H04N 9/32; G06F 15/20; G08C 9/00

[52] U.S. Cl. .................. 358/136; 358/13; 340/347 DD; 364/514; 364/515; 364/582

[58] Field of Search ............ 364/514, 515, 576, 582; 358/12, 13, 133, 138, 260, 261; 340/347 DD

[56] References Cited

U.S. PATENT DOCUMENTS

| | | | |
|---|---|---|---|
| 3,795,763 | 3/1974 | Golding et al. | 358/135 X |
| 3,984,626 | 10/1976 | Mounts et al. | 358/135 |
| 4,005,411 | 1/1977 | Morris | 340/347 DD |
| 4,047,221 | 9/1977 | Yasuda et al. | 358/136 |
| 4,051,530 | 9/1977 | Kuroda et al. | 358/136 |
| 4,054,909 | 10/1977 | Kojima et al. | 358/13 |
| 4,060,797 | 11/1977 | Maxwell et al. | 325/419 X |
| 4,125,861 | 11/1978 | Mounts et al. | 358/133 |
| 4,168,513 | 9/1979 | Hains et al. | 358/261 |
| 4,179,710 | 12/1979 | Ishiguro et al. | 358/13 X |

OTHER PUBLICATIONS

Image Data Compression by Predictive Coding II: Encoding Algorithms Bahl & Kobayashi: IBM J. Res. Develop., Mar. 1974, pp. 172-179.

Frame-to-Frame Coding of Television Pictures Using Two-Dimensional Fourier Transforms: Haskell: IEEE Transactions on Info. Theory: vol. IT-20, No. 1, pp. 119-120: Jan. 74.

Spahal Transform Coding of Color Images: Pratt: IEEE Transactions on Comm. Technology, vol. Com-19, No. 6, Dec. 71, pp. 980-992.

Goertzel et al., *Two-Dimensional Data Compression & Decompression System*; Aug. 7, 1979.

Application of Fourier-Hadamard Transformation to Bandwidth Compression-Pratt & Andrews Proc. Polytechnic Institute of Brooklyn, 1969, pp. 56-68.

Hadamard Transform Image Coding, Pratt, Kane, Andrews, Proc. IEEE, vol. 57, No. 1, Jan. 69, pp. 58-68.

Television Bandwidth Reduction by Encoding Spatial Frequencies, Andrews & Pratt, Journal SMPTE, vol. 77, No. 12, Dec. 1968, pp. 1279-1281.

Television Bandwidth Reduction by Fourier Image Coding; Andrews & Pratt, Paper Delivered to 103rd Technical Conference SMPTE, May 5-10, 1968.

Transform Image Coding, Andrews & Pratt: Proc. Symposium on Computer Processing in Communications, Polytechnic Institute of Brooklyn, Apr. 8-10, 1969, pp. 63-84.

*Primary Examiner*—James W. Moffitt
*Assistant Examiner*—Aristotelis M. Psitos
*Attorney, Agent, or Firm*—David B. Harrison

[57] ABSTRACT

A digital video compression system and its methods for compressing digitalized video signals in real time at rates up to NTSC color broadcast rates are disclosed. The system compressor receives digitalized video frames divided into subframes, performs in a single pass a spatial domain to transform domain transformation in two dimensions of the picture elements of each subframe, normalizes the resultant coefficients by a normalization factor having a predetermined compression ratio component and an adaptive rate buffer capacity control feedback component, to provide compression, encodes the coefficients and stores them in a first rate buffer memory asynchronously at a high data transfer rate from which they are put out at a slower, synchronous rate. The compressor adaptively determines the rate buffer capacity control feedback component in relation to instantaneous data content of the rate buffer memory in relation to its capacity, and it controls the absolute quantity of data resulting from the normalization step so that the buffer memory is never completely emptied and never completely filled. In expansion, the system essentially mirrors the steps performed during compression. An efficient, high speed decoder forms an important aspect of the present invention. The compression system forms an important element of a disclosed color broadcast compression system.

7 Claims, 30 Drawing Figures

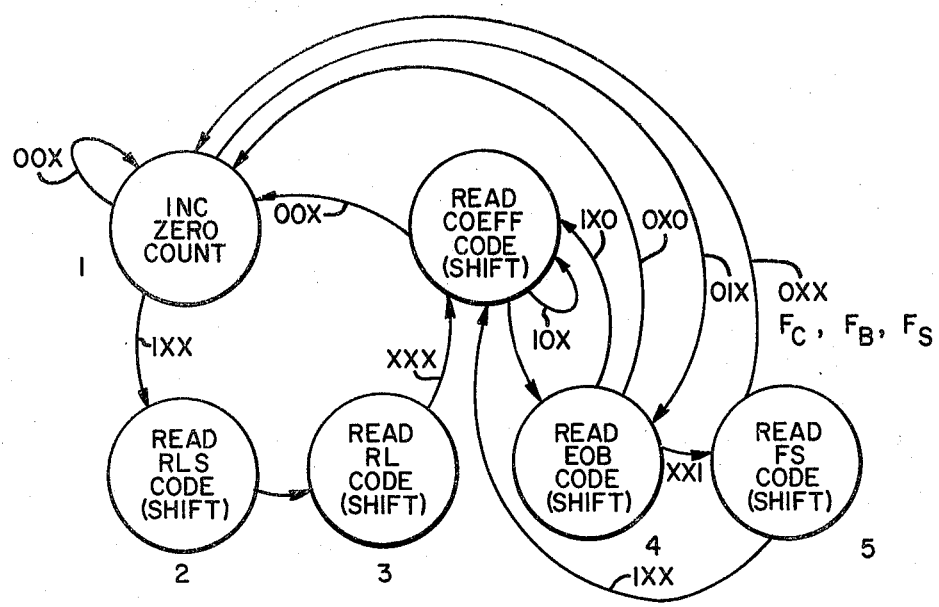
FIG.14
FIG.15
| STATE (Q) | | T = = DELAY THRU STATE LOGIC |
| N. STATE (D) | 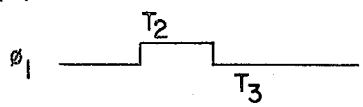 | $T_2$ = DURATION OF ACTION CHANGE |
| CONTROL (C) | | $T_3$ = ADDITIONAL WAIT FOR ACTION |
| $\phi_1$ | | $T_4$ = DURATION OF LATCH CLOSING |
| FLAGS (F) |  | TOTAL = 30 TO 40 ns |
| $\phi_2$ | | |

| STATE | | | FLAG | | | NEXT STATE | | | CONTROL | | | | | |
|---|---|---|---|---|---|---|---|---|---|---|---|---|---|---|
| $Q_1$ | $Q_2$ | $Q_3$ | $F_C$ | $F_B$ | $F_S$ | $D_1$ | $D_2$ | $D_3$ | $\phi_F$ | $\phi_B$ | $\phi_Z$ | $C_S$ | $R_D$ | $N_C$ |
| 0 | 0 | 0 | 0 | 0 | X | 0 | 0 | 1 | 0 | 1 | 1 | 1 | $R_C$ | 1 |
| 0 | 0 | 0 | 1 | 0 | X | 0 | 0 | 0 | 0 | 1 | RST | 1 | $R_C$ | 1 |
| 0 | 0 | 0 | X | 1 | X | 1 | 0 | 0 | 0 | 0 | 0 | 1 | $R_C$ | 0 |
| 0 | 0 | 1 | 0 | 0 | X | 0 | 0 | 1 | 0 | 1 | 1 | 0 | 0 | 1 |
| 0 | 0 | 1 | 0 | 1 | X | 1 | 0 | 0 | 0 | 0 | RST | 0 | 0 | 0 |
| 0 | 0 | 1 | 1 | X | X | 0 | 1 | 0 | 0 | 0 | 0 | 0 | 0 | 0 |
| 0 | 1 | 0 | X | X | X | 0 | 1 | 1 | 0 | 0 | 0 | 1 | RLS | 0 |
| 0 | 1 | 1 | X | X | X | 0 | 0 | 0 | 0 | 0 | 0 | 1 | RL | 0 |
| 1 | 0 | 0 | 1 | X | 0 | 0 | 0 | 0 | 1 | RST | RST | 1 | $R_E$ | 1 |
| 1 | 0 | 0 | 0 | X | 0 | 0 | 0 | 1 | 0 | 1 | 1 | 1 | $R_E$ | 1 |
| 1 | 0 | 0 | X | X | 1 | 1 | 0 | 1 | 0 | 0 | 0 | 1 | $R_E$ | 0 |
| 1 | 0 | 1 | 1 | X | X | 0 | 0 | 0 | RST | 1 | 0 | 1 | $R_F$ | 1 |
| 1 | 0 | 1 | 0 | X | X | 0 | 0 | 1 | RST | 1 | 1 | 1 | $R_F$ | 1 |

FIG. 16

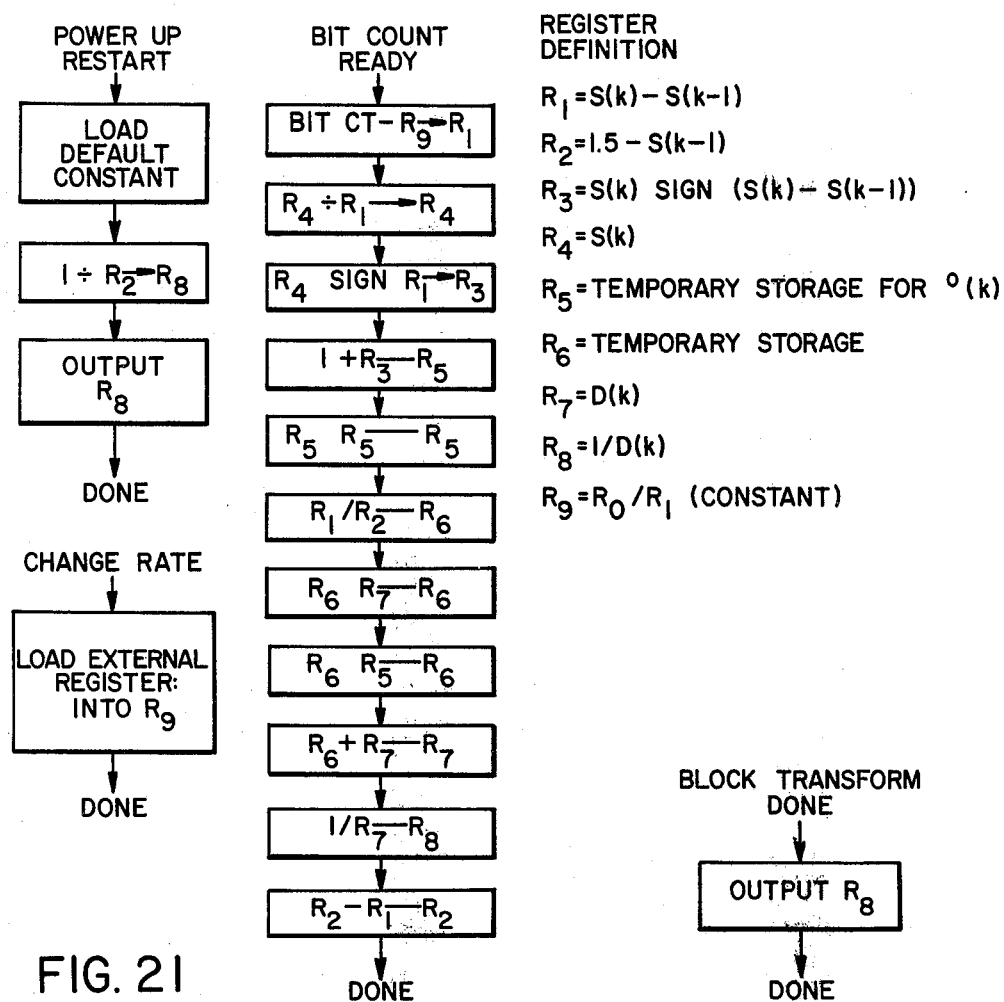
FIG. 21
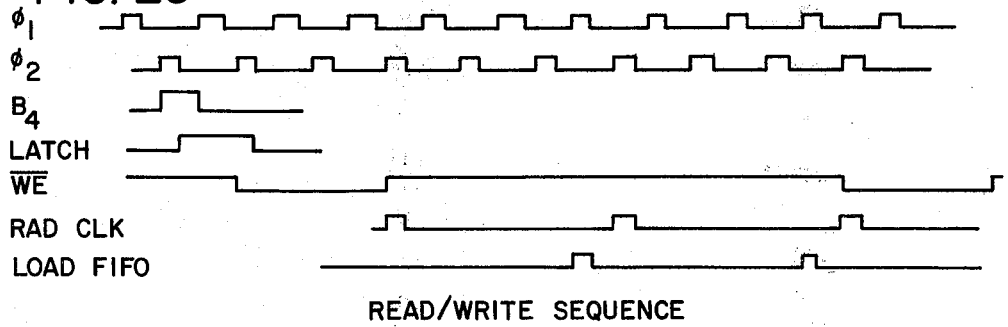
FIG. 23
READ/WRITE SEQUENCE
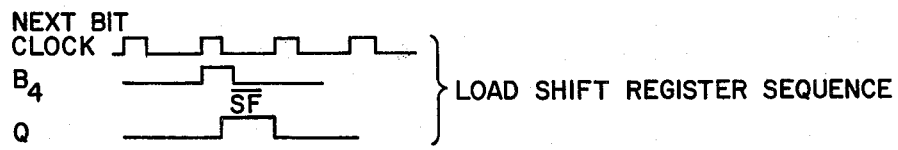
LOAD SHIFT REGISTER SEQUENCE FIG. 26
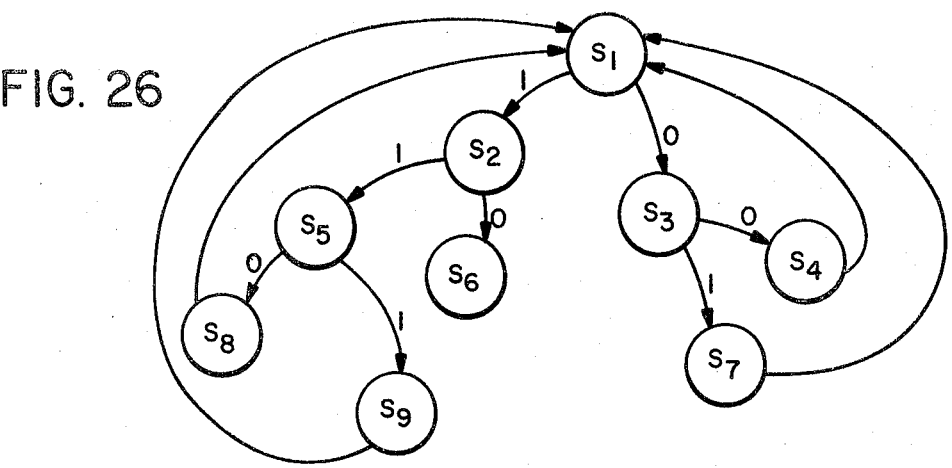
FIG. 27
| | |
|---|---|
| NEXT BIT CLK | 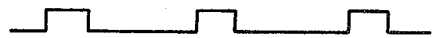 |
| DATA | 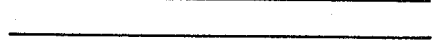 |
| LATCH OUTPUT |  |
| PROM OUTPUT |  |
| LATCH | 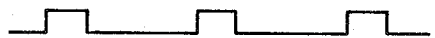 |
| TERMINAL STATE BIT |  |
| SHIFT IN (LOAD FIFO) |  |
FIG. 28
| | |
|---|---|
| SHIFT OUT | 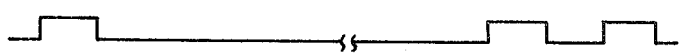 |
| FIFO OUT ZERO CODE |  |
| NEXT COEFF CODE | 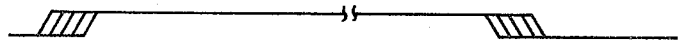 |
| JAM COUNTER | 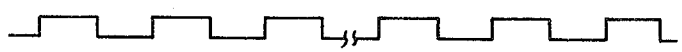 |
| COUNT CLOCK | 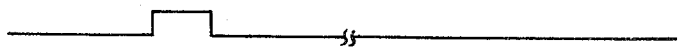 |
| OVER FLOW | 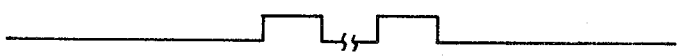 |

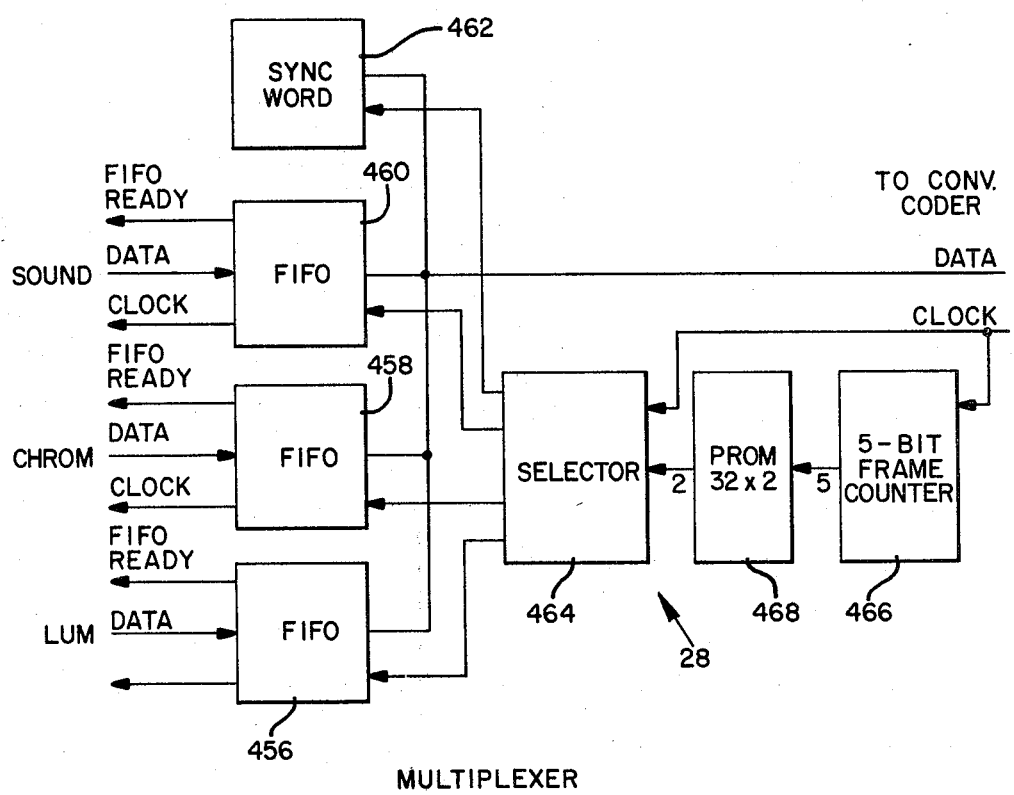
FIG. 30
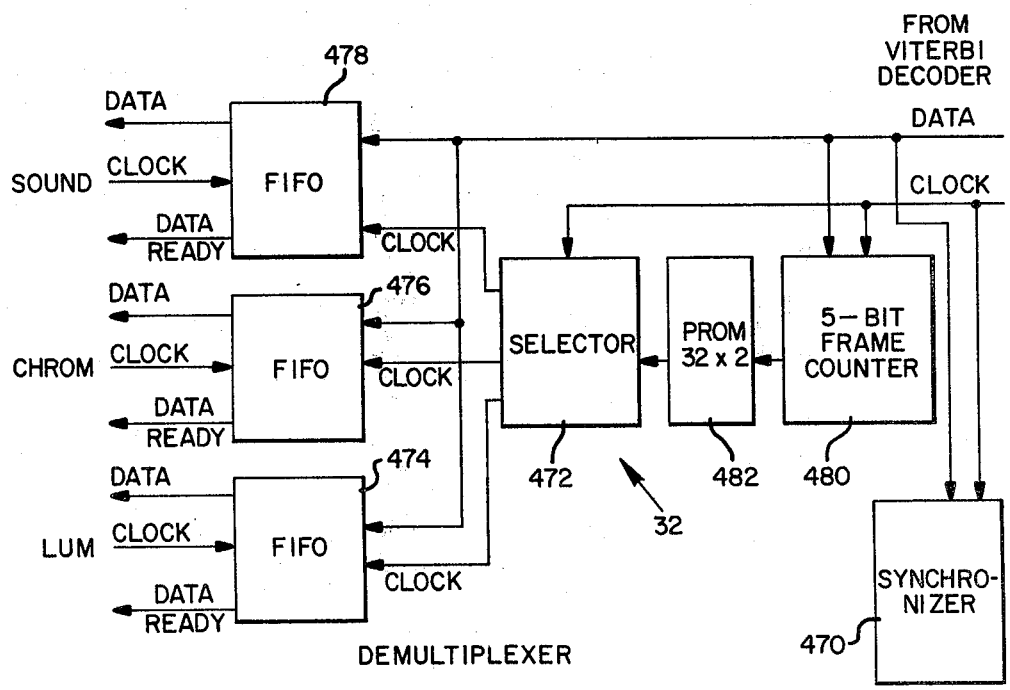

DIGITAL VIDEO COMPRESSION SYSTEM AND METHODS UTILIZING SCENE ADAPTIVE CODING WITH RATE BUFFER FEEDBACK

BACKGROUND OF THE INVENTION

The present invention relates to methods and apparatus for compression, transfer through a limited bandwidth medium, and expansion of digitalized television picture signals at real time rates up to standard broadcast frame rates. More particularly, the present invention relates to methods and apparatus for television picture single pass scene adaptive compression, transfer and expansion with two dimensional transformation in conjunction with compression coding schemes wherein rate buffer feedback is effectively utilized to provide optimalized compression normalization factoring in real time without undue degradation of restored picture imagery and with minimized hardware implementation requirements.

Digital coding techniques are increasingly employed in processing television signals for transfer over noisy transmission channels. Digital data streams may be made essentially free of noise degradation, and this advantage in the transmission of digitized information has been advantageously utilized over long, noisy transmission paths. Thus, it is an increasingly common practice today to digitalize broadcast television signals for transmission and relay through otherwise noisy long distance paths, such as stationary earth satellites many thousands of miles away from the earth.

To digitize a television signal, a significant number of bits, 4, 5, 6 or even more, may be required to provide for the proper range of gray scale of each of the hundreds of thousands of separate picture elements (pixels). Consequently, data rates for digitalized television signals are far in excess of the highest frequency components of analog television signals. It is not unusual to find in a digitalized television communications link, a required video bandwidth of 40 megabits per second. While digitalized television transmission formats advantageously overcome the signal to noise problems inherent in analog transmission over similar path lengths, the substantial bandwidths for such digitalized signals often occupy the entire bandwidth capability of the communications link. If the communications link is an earth satellite in stationary orbit above the earth, the video signal typically occupies the entire transponder bandwidth of the satellite, with very few channels, if any, left over for other uses. Thus, need has arisen for a practical yet effective way to reduce the bandwidth of digitalized television signals to provide for more channels within a communications path such as an earth satellite.

BRIEF DESCRIPTION OF PERTINENT PRIOR ART

It is known and discussed in the prior art relating to television image bandwidth compression that two-dimensional cosine transform techniques have yielded reproduced pictures of superior quality at the same and even higher picture data compression ratios than were obtainable with other transforms or techniques. Heretofore, television picture compression techniques have been directed to simple implementations with substantial throughput speeds in real time with concomitant significant degradation of restored picture resolution and the introduction of unwanted compression process artifacts into the restored picture. Such techniques have included two-dimensional digital pulse code modulation schemes with block adaptive coding or with rate buffering; hybrid cosine transformation and digital pulse code modulation schemes; and, unidimensional, bidimensional and hybrid Haar-Hadamard transformations. Run length coding has also been employed.

Two basic techniques for coding transform domain coefficients are known in the prior art, namely zonal coding and adaptive coding. Zonal coding essentially eliminated all high frequency picture transform coefficients regardless of energy content with a resultant loss of picture detail upon reconstitution of the picture. On the other hand, adaptive coding schemes, including threshold sampling techniques, were used to identify and preserve large amplitude high frequency coefficients, and those schemes provided reconstituted pictures having less distortion from the compression process at significantly higher degrees of compression. In threshold sampling when a coefficient exceeded a preset amplitude, it was sent with full precision (normally 6 to 8 bits), and many times a coefficient was transmitted with 8 bits when one or two bits would have accurately characterized the coefficient.

Adaptive coding techniques followed two basic approaches: multiple class energy bit map coding and recursive coding with rate buffer feedback. In the multiple class bit map approach, transform sub-frames of the picture were sorted into categories related to the level of image activity present in each sub-frame. Within each activity level, AC energy coding bits were allocated to individual transform elements in classes according to a variance matrix of the transform data with the variance matrix being computed for each of the classes and different bit allocation matrices being created with more bits being assigned to areas of high image activity and fewer bits to those areas of lower activity. Such classifications were carried out either with a two-pass statistical gathering and mapping scheme or with a fixed pregenerated statistical model created upon assumptions made for the particular system application.

In the two-pass approach, the first pass of processing generated statistics for sub-block classification maps, set up bit assignment matrices and calculated normalization factors for compression. The second pass was for multiplying the normalization factor to quantize transform coefficients, for encoding the resultant data, and for adding overhead information. The drawback of the two pass approach is the substantial times required for two pass processing within existing equipment which unduly limited the size of pictures to be compressed and the number of sub-frame activity classifications that could be utilized. Also, the hardware requirements for real time implementation were prohibitively complex, and hence the two pass approach is presently impractical, particularly at picture broadcast rates.

The pregenerated statistics modeling approach suffered from the fact that no pregenerated statistics ever exactly matched those of a real time picture being compressed. Additionally, several sets of pregenerated statistics were often needed to accommodate multiple applications which required multiple passes to preselect the most nearly appropriate statistical set to be utilized for the particular picture.

In the recursive coding with rate buffer feedback scheme, the sub-frame activity was determined by the estimated variances of the transform coefficients, the variances being derived by a simple linear predicter.

One significant drawback in the recursive coding approach was the elimination of high frequency AC coefficients, including those having significant amplitudes. Once the linear predictor produced a variance which needed a zero bit assignment, the encoding of that particular picture subframe was terminated, and all subsequent AC terms, including those with significant values, were lost. Such losses unduly degraded high activity regions in the reconstituted pictures following inverse expansion and reconstruction of the compressed picture signal. Another drawback of the recursive coding scheme was that heretofore there has been no theoretical analysis which justifies the assumed optimality of a linear predictor. One feature of recursive coding which has been advantageously incorporated into and significantly expanded in the present invention is that of the rate buffer technique.

A major problem with image data compression has been the non-stationarity of image statistics. Early coding schemes such as a single map zonal coder attempted to ignore the problem by assuming image statistics as a stationary process. The Markov model used by investigators was an example of the stationary statistical characterization of image data. Adaptive coding procedures have been proposed to take care of the non-stationary nature of the image processes and to improve the image quality. A well designed adaptive coder generally needs a priori non-stationary statistical information. This a priori information can either be estimated or computed on line, or predetermined a priorily. Neither case is desirable since it causes complications in hardware implementation on the former and causes statistical mismatches on the latter. The undesirable feature can be eliminated by introducing the rate buffer concept for the channel rate equalization in accordance with the present invention.

SOME OBJECTS OF THE PRESENT INVENTION

A general object of the present invention is to provide a digital video compression system which effectively combines scene adaptive coding with rate buffer feedback in methods and apparatus which overcome limitations and drawbacks of the prior art.

Another object of the present invention is to provide a digital video compression system which operates effectively at real time picture frame rates as high as those of the NTSC color broadcast standards.

Another object of the present invention is to combine novel circuits and subsystems into a digital video compressor and expander which effectively compresses the bandwidth of a television picture in accordance with novel methods and techniques.

Another object of the present invention is to provide a digital video compression system which effectively implements a two-dimensional discrete cosine transform of blocks of the picture.

Another object of the present invention is to provide a digital video compression system which effectively implements a two-dimensional transform in which the DC term of each transformed picture block may always be transmitted in a fixed number of bits.

Another object of the present invention is to provide a digital video compression system which effectively implements a two-dimensional transform of blocks of the picture in which uniformly quantized AC coefficients of each block fall into a single Huffman codeable statistical set.

Another object of the present invention is to provide a digital video compression system which effectively implements a two-dimensional transform of blocks of the picture in which low order uniformly quantized AC coefficients can be efficiently Huffman coded by the compressor and decoded by the expander in accordance with a predetermined Huffman code table, without transmitting the Huffman table or generating a new table for each block.

Another object of the present invention is to provide a digital video compression system which implements a two-dimensional transform of blocks of the picture in which long strings of zero value high order AC coefficients may be effectively run length encoded and in which high amplitude high order AC coefficients will be preserved.

Another object of the present invention is to provide a digital video compression system which implements a two-dimensional transform of blocks of the picture in which variance calculations, bit allocation matrix calculations, and nonlinear block quantization are eliminated and not required in the compression process.

Another object of the present invention is to provide a single pass digital video compression system which implements a two-dimensional transform of blocks of the picture which eliminates the requirement of preliminary statistical matching or preprocessing to determine applicable statistics needed by prior two-pass picture compression techniques.

Another object of the present invention is to provide a digital video compression system which effectively utilizes rate buffer feedback control to provide global adaptivity of the system to the picture in real time.

Another object of the present invention is to provide a digital video compression system which requires only one two-dimensional block of a fraction of the picture for input buffering, but which in practice will buffer at input an image strip of blocks of the same number of lines as defines the block size and will further provide some preformatting of the data.

Yet another object of the present invention is to provide a digital video compression system in which the output of the compression process yields a white noise error image with no apparent structure.

A further object of the present invention is to provide a digital video compression and expansion system in which the expander includes an instantaneous decoder which operates on each bit as it is received.

SUMMARY OF THE INVENTION

An NTSC color broadcast compression and expansion system incorporating the principles of the present invention divides the color picture into luminance (monochrome) and I and Q chrominance components. The luminance signal is compressed and expanded with the scene adaptive coding with rate buffer feedback techniques of the present invention. The I and Q chrominance components are given simple spatial low pass filtering followed by spatial subsampling with two-dimensional interpolation at the system receiver. The audo is filtered and sampled at a predetermined rate, with each sample quantized to a predetermined bit resolution. The digitalized and compressed luminance (including picture synchronization pulses) chrominance and audio components are multiplexed together with bit stream synchronization codes and transmitted as a single composite bit stream.

The scene adaptive coding with rate buffer feedback compression system of the present invention receives each digitalized video luminance frame divided into a predetermined matrix of subframes or blocks. The compressor performs a spatial domain to transform domain transformation in both horizontal and vertical dimensions of the picture elements of each subframe to provide transform coefficients corresponding to each subframe. The compressor normalizes the coefficients by a normalization factor having a predetermined compression ratio component and an adaptive rate buffer capacity control feedback component to provide compression to the transform coefficients and to provide normalized transform coefficients compatible with a predetermined data coding scheme. The coefficients are encoded in accordance with, e.g., Huffman codes and zero coefficient run length codes, and then stored in a first rate buffer memory asynchronously at a high data transfer rate from which they are put out at a slower, synchronous bit stream rate capable of passing through a limited bandwidth medium. The compressor adaptively determines the rate buffer capacity control feedback component in relation to the instantaneous data content of the rate buffer memory in relation to its capacity to control at normalization the absolute quantity of data resulting from that process so that the buffer memory is never completely emptied and never completely filled.

In expansion, the system stores the coded coefficients in a second, decoder rate buffer memory at the slow synchronous data transfer rate through the limited medium. The coefficients are then put out from the second memory asynchronously at a high data transfer rate. The coefficients are decoded in accordance with an inverse of the predetermined coding scheme, and then the decoded coefficients are inversely normalized by operation of an inverse normalization factor with a predetermined expansion ratio coefficient and an adaptive decoder rate buffer capacity control feedforward component to provide expansion of the transform coefficients.

The scene adaptive coded picture expansion system adaptively determines the rate buffer capacity control feedforward component in relation to the instantaneous data content of its rate buffer memory in further relation to its capacity. This is done to control at an inverse normalization step the absolute quantity of data resulting therefrom and thus the rate which the coded coefficients are put out advantageously from the expander's rate buffer memory so that it, too, is never completely emptied and never completely filled. A high speed decoder decodes Huffman and run-length codes in real time in accordance with a "tree" state functional scheme which progressively decides upon a new state on the basis of the old state and the next bit received. The scene adaptive expansion system then performs the inverse of the predetermined transformation of the expanded transform coefficients to provide reconstituted luminance picture elements of the subframes.

The subframes are then assembled into the predetermined matrix to reconstruct the digitalized luminance picture frame which closely approximates the corresponding original frame. The scene adaptive compression/expression process is repeated frame by frame in real time and the compression ratios achieved are significant, on the order of 40 to 1.

The color broadcast signal is recovered by demultiplexing the decoded luminance, chrominance and audio signals at the system receiver, and these signals are then provided as output.

Other objects, advantages and features of the present invention will become apparent from the following detailed description of a preferred embodiment, presented with the accompanying drawings.

BRIEF DESCRIPTION OF THE DRAWINGS

In the drawing:

FIG. 14 is a state diagram for the encoder controller of FIG. 13.

FIG. 15 is a timing diagram of the encoder controller of FIG. 13.

FIG. 16 is a state table for the encoder controller of FIG. 13.

FIG. 21 is a flow diagram of calculations performed by the rate normalization processor of FIG. 20.

FIG. 22 is a block diagram of the receive buffer memory in the luminance decoder of FIG. 3.

FIG. 23 is a timing diagram for operational sequences of the receive buffer memory of FIG. 22.

FIG. 26 is a state diagram of the Huffman decoder of FIG. 25.

FIG. 27 is a timing diagram of terminal state sequence of the Huffman decoder of FIG. 25.

FIG. 28 is a timing diagram of the zero insertion sequence of the Huffman decoder of FIG. 25.

FIG. 30 is a block diagram of the multiplexer and demultiplexer of the system of FIG. 1.

DETAILED DESCRIPTION OF A PREFERRED EMBODIMENT

Compressor 10 and Expander 12

Figure 1:
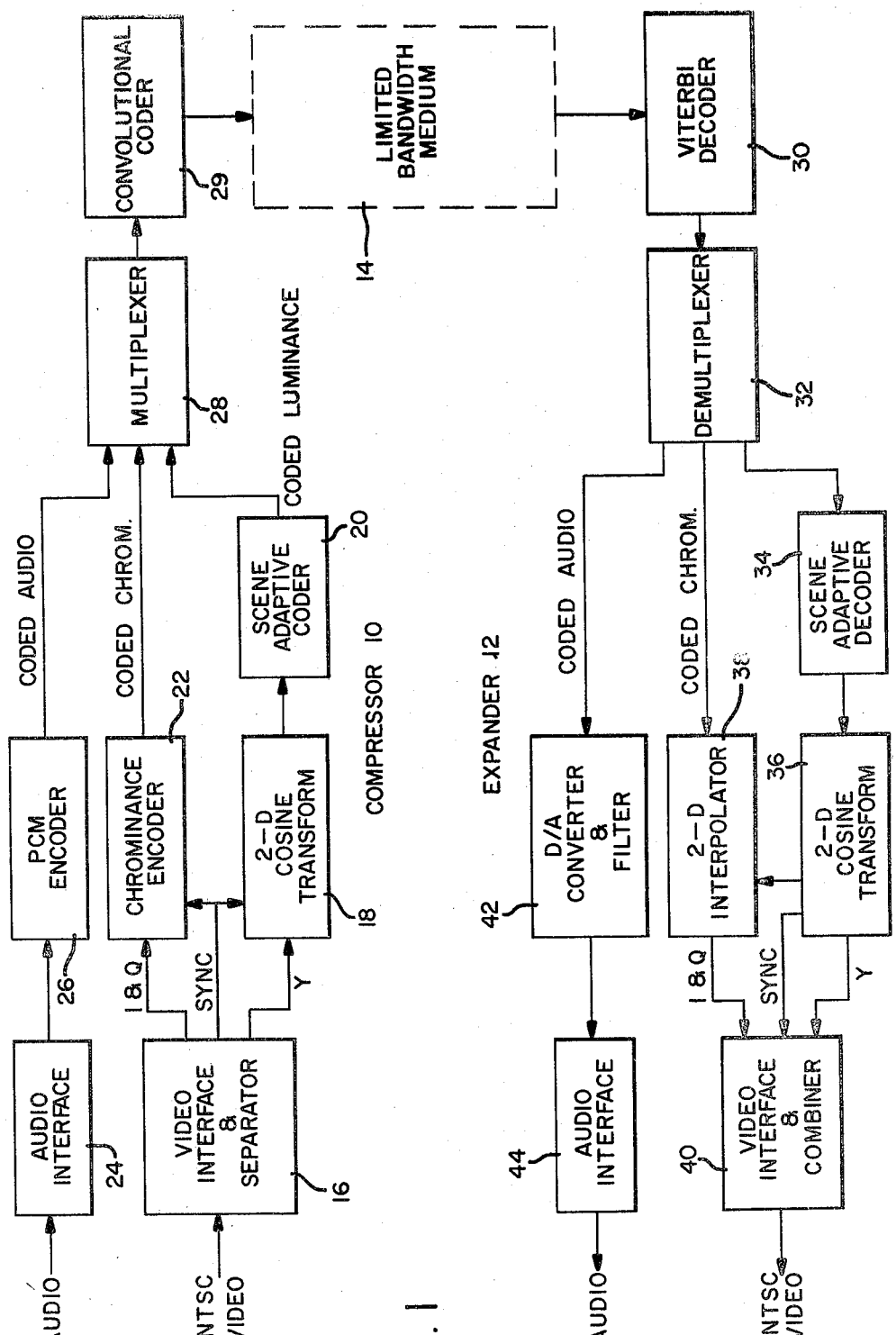
FIG. 1 is a block diagram of an NTSC color broadcast compression and expansion system in accordance with the principles of the present invention.

A functional block diagram of an NTSC color broadcast compression/expansion system is provided by FIG. 1. The system includes a composite signal compressor 10. A composite signal expander 12 is connected to the compressor 10 via a limited bandwidth transmission medium 14.

The compressor 10 includes a standard video interface and sync separator 16 which accepts a composite color video input, extracts vertical and horizontal synchronization signals from the video, and demultiplexes luminance (Y) and chrominance (I,Q) components thereof. The separated luminance or monochrome video component along with composite color synchronization information is provided to a horizontal and vertical dimension cosine transformer 18 and a scene adaptive coder 20 which transform and compress the composite luminance video in accordance with principles of this invention. The transformer 18 and coder 20 are described later in connection with FIGS. 2-28.

Separated chrominance components (I,Q) are provided to a chrominance encoder 22 which is described in connection with FIG. 29. Audio is passed through an audio interface 24 which includes an anti-aliasing filter, and then a standard audio PCM encoder 26 which samples the audio at, e.g., 31.25 KHz/sec. and quantizes the samples to, e.g., 256 levels (8 bits). This generates an, e.g., 250 kilobit/sec. data rate. The exemplary sampling rate provides a standard broadcast quality 15 KHz bandwidth audio channel, and the quantization achieves a 55 dB signal to noise ratio.

Coded luminance from the scene adaptive coder 20, coded chrominance from the chrominance encoder 22, and coded audio from the PCM encoder 26 are combined in a multiplexer 28 in a time division format in which the serial bit stream is divided into frames of, e.g., 32 bits. Each frame begins with a sync bit followed by an audio bit, then 10 bits of chrominance and 20 bits of luminance. Preferably, the frame sync bits are alternated in a repetitive pattern which aids in sync acquisition. One entire multiplex frame is reserved for an, e.g., 20 bit "end of block" code which is inserted in a fixed place in the frame to avoid loss of synchronization and catastrophic picture failure in the event of propagation of a bit error. Bit errors can cause incorrect decoding in a way in which code-sync is entirely lost. Use of an end of block code assures restoration of sync without catastrophic picture failure.

In the event that greater security is required against bit error transmission and loss of sync, a convolutional coder, such as a rate one half coder 29 and Viterbi decoder 30 may be used. The coder 29 and decoder 30 are available commercially, and a Linkabit LV 7017A works well.

The expander 12 includes a demultiplexer 32 connected to the Viterbi decoder 30. The demultiplexer 32 separates audio, chrominance and luminance. The luminance is sent to a scene adaptive decoder 34 and two dimensional inverse cosine transformer 36 which restores the original analog picture field/frame format to the luminance (Y) channel. The chrominance is passed through a two dimensional chrominance interpolator 38, described later in connection with FIG. 29, which puts out the chroma I and Q subcarriers. The chrominance and luminance components are recombined, along with recovered picture sync in a video interface and combiner 40 which puts out a composite color signal.

Audio from the demultiplexer 32 is first passed through a PCM digital to analog converter and filter 42 and then an audio output interface 44 which is the symmetrical inverse of the input interface 24.

Principles of Scene Adaptive Coding with Rate Buffer Feedback

In accordance with one aspect of the present invention, the normalization factor with rate buffer feedback enables a desired variable coding rate for incoming data to be achieved while approaching at all times convergence of an overall desired rate. The normalization process can best be described by mathematical equations written for a 16 pixel (picture element) by 16 pixel block (subframe).

In the adaptive coder 20 of the preferred embodiment, the quantizer is scaled appropriately according to local image statistics and gives rise to a variable rate coding scheme. An appropriate buffering associated with variable rate transform coding on the input and fixed rate channel on the output, then, adapts the coder 20 to local statistical characteristics of the data. The rate buffer will force the adaptive coder 20 to adjust to the local coding variations while ensuring global performance at the desired level.

The rate buffer with feedback normalization factor is designed to permit the desired variable coding rate for incoming data while attempting at all times to converge to the overall rate. The operation can best be described by mathematical formulation: Let $\bar{R}$=desired channel operating rate $R(i)$=required rate for the ith block $\hat{R}(i)$=accumulated rate at the end of the ith block $n(i)$=number of bits into the rate buffer for the ith block $D(i)$=feedback normalization factor for the ith block $\hat{D}(i)$=accumulated normalization factor for the ith block $\alpha(i)=\Delta D(i)/\Delta R(i)$=slope of the D vs. R curve at the time of the ith block $S(i)$=normalized buffer status at the end of the ith block $N$=size of the rate buffer in bit $F_i(u,v)$=cosine transform coefficients of the ith block $\phi(k)$=damping factor at the end of the ith block.

Without loss of generality, assume that the rate buffer is initially half full. The buffer status of this half full position is defined as $S(O)=0$. The buffer status is normalized and can swing within $\pm 0.5$. For a given channel code rate $\bar{R}$, buffer size N, initial conditions are set to $D(1)=D>0$ $\alpha(1)=\alpha<0$ The number of bits into the buffer for the first block which is a function of the Huffman code can be represented by $$n(1) = \sum_{\substack{u=0 \\ (u,v) \neq (0,0)}}^{15} \sum_{v=0}^{15} H F_1 \{(u,v)/D(1)\} + F_1(0,0) \quad (1)$$

the first term on the right is the number of Huffman code bits into the buffer for the ac coefficients in the first block while the second term accounts for the number of code bits for the dc term. The buffer status at the end of the first block can be written as, $$S(1) = \frac{1}{N}[n(1) - 256\overline{R}] \quad (2)$$

and gives the normalized deviation of the buffer from its normal half-full status. It is assumed that the block size is 16 by 16=256 coefficients, so that $256\overline{R}$ is the number of bits out the buffer at the end of the first block. The normalization factor $D(1)$ during the first block operation is assumed to be the initial condition set $D(1)=D$.

The accumulated rate is then simply given by, $$\hat{R}(1) = n(1)/256 \quad (3)$$

The average feedback normalization factor at this time is identical to the initial condition, i.e., $$\hat{D}(1) = D(1) = D \quad (4)$$

Now due to the buffer status change the required rate for the second block has to be modified in order to force the buffer to stay as close to the normal half full position as possible. This modification can be described by $$R(2) = \overline{R}[1.0 - S(1)] \quad (5)$$

The deviation between the required rate for the second block and the accumulated rate at the end of the first block forces the feedback normalization factor to change to $$D(2) = \alpha(d)[R(2) - \hat{R}(1)] + \hat{D}(1) \quad (6)$$

The process carries on block by block basis until the last block of the image is completed.

The generalized equations for the $K^{th}$ block ca be written as:

$$n(k) = \sum_{\substack{u=0 \\ (u,v) \neq (0,0)}}^{15} \sum_{v=0}^{15} H \{F_K(u,v)/D(K)\} + F_K(0,0) \quad (7)$$

$$S(K) = \frac{1}{N}\left[\sum_{i=1}^{K} n(i) - 256 K \overline{R}\right] \quad (8)$$

$$\hat{R}(K) = \frac{\sum_{i=1}^{K} n(i)}{256 K} \quad (9)$$

$$\hat{D}(K) = \frac{1}{K} \sum_{i=1}^{K} D(i) \quad (10)$$

$$R(K+1) = \overline{R}[1.0 - S(K)] \quad (11)$$

$$D(K+1) = [\Phi(K)]^m \alpha(K)[R(K+1) - \hat{R}(K)] + \hat{D}(K) \quad (12)$$

A damping factor $\Phi(K)$ is introduced in Equation (12) to keep the data inside the rate buffer rapidly converging towards the normal half full position. The introduction of the damping factor not only keeps the data inside the buffer in rapid convergence but also allows one to use a small size buffer for a practical application. The damping factor is strictly dependent upon buffer status and is given by:

$$(K) = 1 + \theta S(K) \quad (13)$$

where $\theta$ is a positive constant.

The slope $(K)$ in Equation (12) is estimated from $R(K)$ and $D(K)$ regardless of the input images, as:

$$|\alpha(K)| = |D(K)/R(K)| \quad (14)$$

This image independent relationship can be derived by modelling the rate and feedback normalization curve as:

$$RD = C \quad (15)$$

where $C$ is a constant. It can easily be shown that for this model $$dD/dR \cdot R/D = -1$$

or $$\alpha = dD/dR = -D/R \quad (16)$$

Equations (7) through (12) can be combined to obtain $$D(K+1) = -[\phi(K)]^m \alpha(K) \left[\left(\frac{R}{N} - \frac{1}{256K}\right) \left\{\sum_{i=1}^{K} \sum_{\substack{u=0 \\ (u,v) \neq (0,0)}}^{15} \sum_{v=0}^{15} H\{F_i(u,v)/D(i)\} + F_i(0,0)\right\} - \overline{R}\left(1 + \frac{256K}{N}\right)\right] + \frac{1}{K}\sum_{i=1}^{K} D(i) \quad (17)$$

The solution of this difference equation essentially gives the feedback normalization constant $D(K)$ for the required rate $R(K)$ for the $K^{th}$ block.

The desired operating conditions for the rate buffer algorithm are:

(a) The feedback normalization factor must be as stable as possible.

(b) The buffer status must be able to converge rapidly and stay as close to the half full position as possible. The condition (a) is key to the performance of the adaptive coder system while the condition (b) is key to the stability of the rate buffer algorithm. These two conditions generally work against each other. However with a proper compromise between them a stable system can be achieved with little loss in image quality. By providing enough dynamic range for the feedback normalization factor $D(K)$ the problem of both the underflow and overflow can be successfully prevented, thereby satisfying the desired operating condition (b) above with a minimum buffer size and a moderate damping factor.

Scene Adaptive Coding/Decoding System

Figure 2:
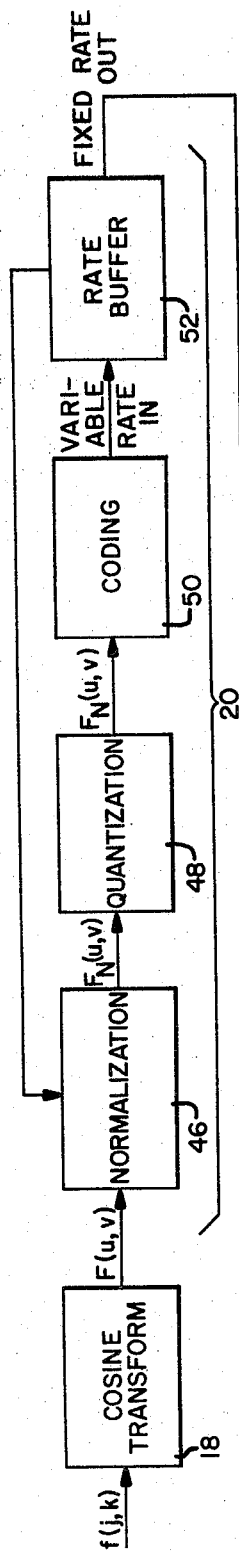
FIG. 2 is a functional block diagram of the scene adaptive coding and decoding method with rate buffer feedback in accordance with the principles of the present invention.
Figure 3:
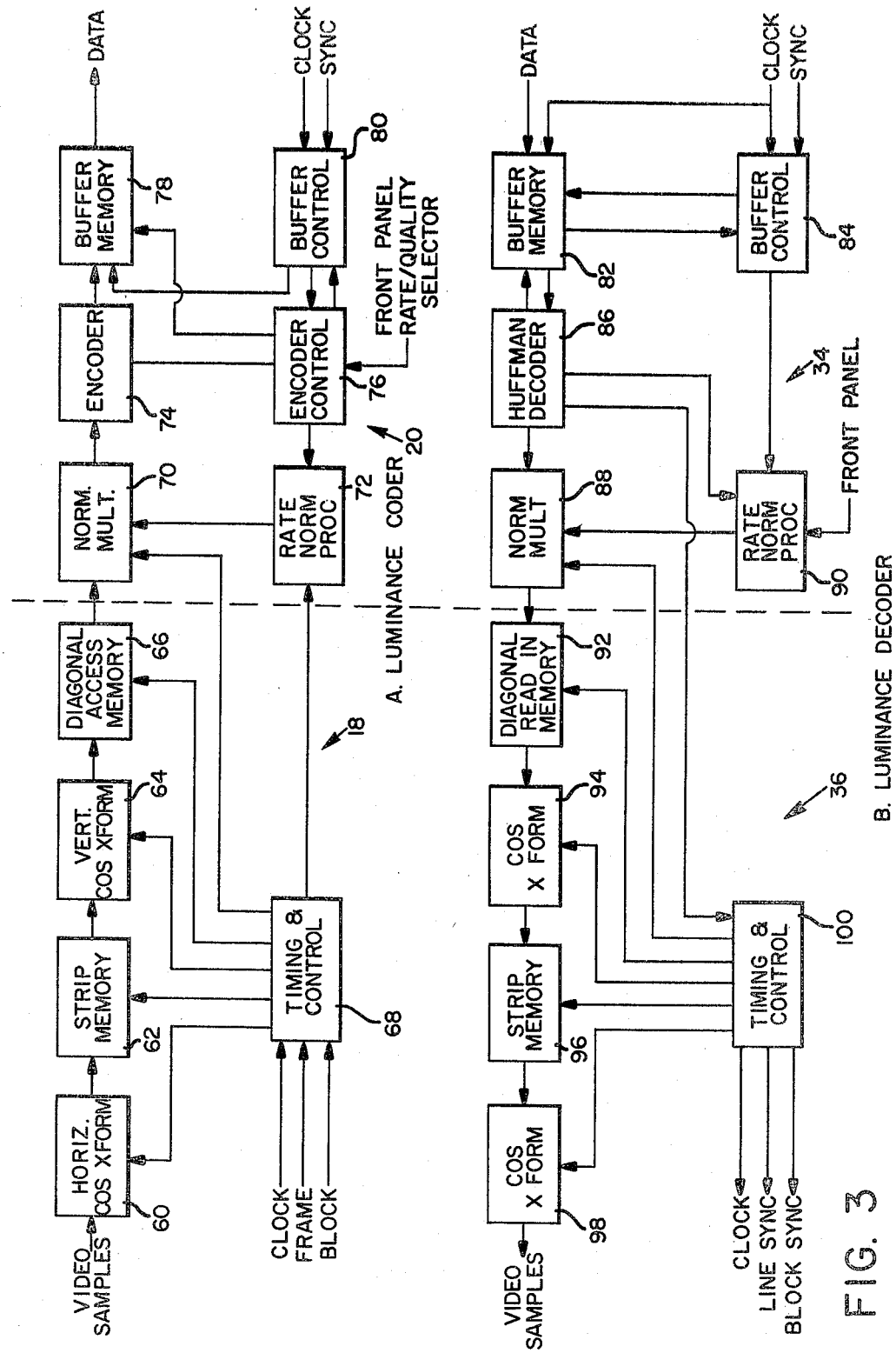
FIG. 3 is a detailed block diagram of the scene adaptive luminance coder and scene adaptive luminance decoder of the system of FIG. 1.

The scene adaptive coding and decoding components of the compressor 10 and expander 12 are functionally depicted in the block diagram of FIG. 2, and are shown architecturally in the structural block diagram of FIG. 3.

In the cosine transformer 18, the original image undergoes a two-dimensional cosine transform in 16×16 pixel (picture element) blocks. In the scene adaptive coder 20, the resultant transform coefficients are first normalized at a normalization step 46 by a feedback parameter from a rate buffer. The normalized coefficients are then quantized at a quantization step 48, Huffman coded and run length coded at a coding step 50, and are then rate buffered in a buffering step 52. The rate buffering process 52 is characterized by a variable data rate input and a constant data output with differentials monitored from block to block and the instantaneous buffer status fed back to control data quantity at the normalization step 46.

In the decoder 34 the received fixed rate data are converted to a variable rate in a rate buffering step 54. Then the data are Huffman decoded and run length decoded in a decoding step 56. The decoded data are then inverse normalized at a normalization step 58 by a feed forward parameter developed at the buffering step 54. An inverse two dimensional discrete cosine transform is then performed by the transformer 36 to reconstruct the spatial picture data. The expander rate buffering process 54 keeps track of data flow in the same way as is done by the compressor rate buffering step 52. Thus, no overhead is required anywhere throughout the coding and decoding processes.

Luminance Coder: Cosine Transformer 18 and Scene Adaptive Coder 20

As shown in FIG. 3, the video compressor 10 includes in the cosine transformer 18, a horizontal dimension cosine transformer 60, a corner turning strip memory 62, a vertical dimension cosine transformer 64, a diagonal access memory 66, and a transform timing and control element 68. The scene adaptive coder 20 includes a normalization multiplier 70, a rate normalization processor 72, an encoder 74, an encoder controller 76, a buffer memory 78, and a buffer controller 80, shown diagrammatically with interconnecting data and control signal paths in FIG. 3. Data exits the luminance coder and passes either directly through the communications channel 14 or after multiplexing with chrominance, audio and sync, as shown for the compressor 10 in FIG. 1.

Luminance Decoder: Scene Adaptive Decoder 34 and Cosine Transformer 36

Referring to FIG. 3, transmitted data is received into a luminance decoder comprising the scene adaptive decoder 34 and inverse cosine transformer 36. The decoder includes an input buffer memory 82, a buffer controller 84, a Huffman/run length decoder 86, a normalization multiplier 88, and a rate normalization processor 90. The inverse two dimensional cosine transformer 36 includes a diagonal read in memory 92, a vertical dimension inverse cosine transformer 94, a corner turning strip memory 96, a horizontal dimension inverse cosine transformer 98, and a transform timing and control element 100, as shown in FIG. 3 along with interconnecting data and control signal lines.

Two-Dimensional Cosine Transformers 18, 36

Processors capable of implementing the fast discrete cosine transform are known in general theory to those skilled in the art. The transform processors 60, 66, 94 and 98 are the most critical elements of the entire system by virtue of the sheet magnitude of the calculations and speeds required to produce the required transform coefficients at NTSC rates. The processors 60, 64, 94 and 98 are substantially identical to one another and only the horizontal dimension cosine transform processor 60 will be described, it being understood that the other three processors 64, 94 and 98 are substantial duplications of the processor 60.

Cosine Processor 60

The cosine transform processor 60 is a modified implementation of a discrete cosine transform algorithm suggested by the coinventors Chen and Fralick and by C. H. Smith in a paper entitled "A Fast Computational Algorithm for the Discrete Cosine Transform," published in *IEEE Transactions on Communications*, September 1977.

Figure 4:
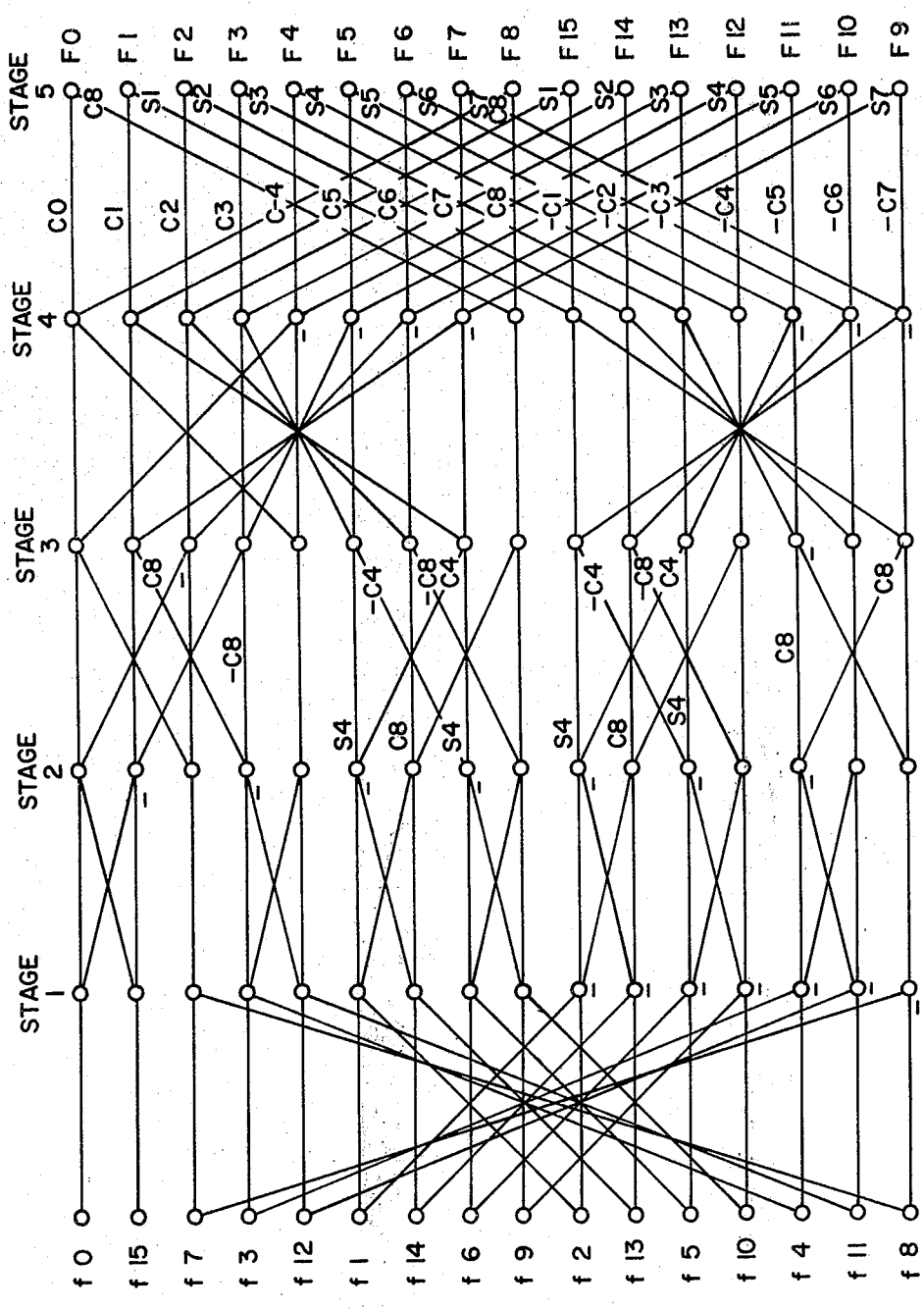
FIG. 4 is a trellis diagram for the discrete cosine transform in one dimension which is implemented in both of the horizontal and vertical cosine transformers of the luminance coder of FIG. 4.

It is the fastest algorithm known, in the sense that it requires the fewest multiply cycles. Furthermore, it is particularly well-suited to a modular pipelined processor. A trellis diagram for this algorithm is shown in FIG. 4. Computations are grouped into five sets of 16 operations. These five stages are:

Stage 1: Sixteen pairs of input data ($f_{1x}$) points are added or subtracted to result in sixteen intermediate ($f_{2x}$) results. This is called a shuffle and add operation.

Stage 2: This is a second shuffle and add operation with a different shuffling rule operating on $f_{2x}$ to result in $f_{3x}$.

Stage 3: In this stage, the sixteen intermediate results ($f_{3x}$) are shuffled, multiplied by constants (in some cases ±1) and, pairwise, added to result in sixteen more intermediate results ($f_{4x}$).

Stage 4: This is another shuffle and add operating on $f_{4x}$ with a new shuffling rule to result in $f_{5x}$.

Stage 5: This is a second shuffle, multiply and add stage with a new shuffling rule and a new set of multiplier constants. The result is $F_0$, the cosine transform.

Figure 5:
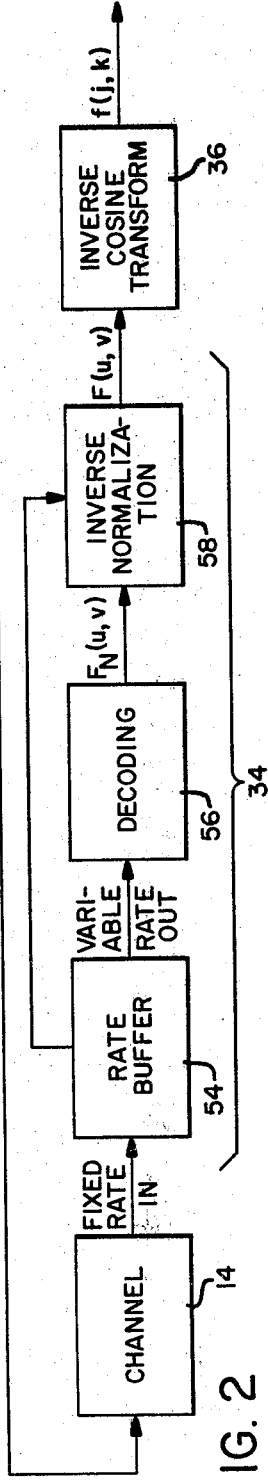
FIG. 5 is a block diagram of the discrete cosine transformer used for the horizontal and vertical cosine transformer of the luminance coder of FIG. 3.

Thus, the one-dimensional cosine transform processor 60 may be implemented from a series of shuffle and add stages and shuffle, multiply and add stages. This pipelined concept is shown diagrammatically in FIG. 5. In FIG. 5, data is passed through a first shuffle and add circuit 102, shown diagrammatically in FIG. 6, and configured to perform the arithmetic operations required at stage 1 of the trellis diagram (FIG. 4). A second shuffle and add circuit 104 (FIG. 6) performs the operations required at stage 2 (FIG. 4). A shuffle, multiply and add circuit 106 shown in FIG. 7, performs the operations required at stage 3 (FIG. 4), and a third shuffle and add circuit 108 performs the operations required at stage 4 (FIG. 4). A second shuffle, multiply and add circuit 110 performs the calculations required at stage 5 (FIG. 4).

In the implementation shown in FIG. 5, the entire processor 60 is synchronously clocked at the input data rate. During each clock cycle, each stage is provided with a set of control signals which control the stage operation. A four bit counter 112 and a control PROM 114 are provided to control each stage.

Figure 6:
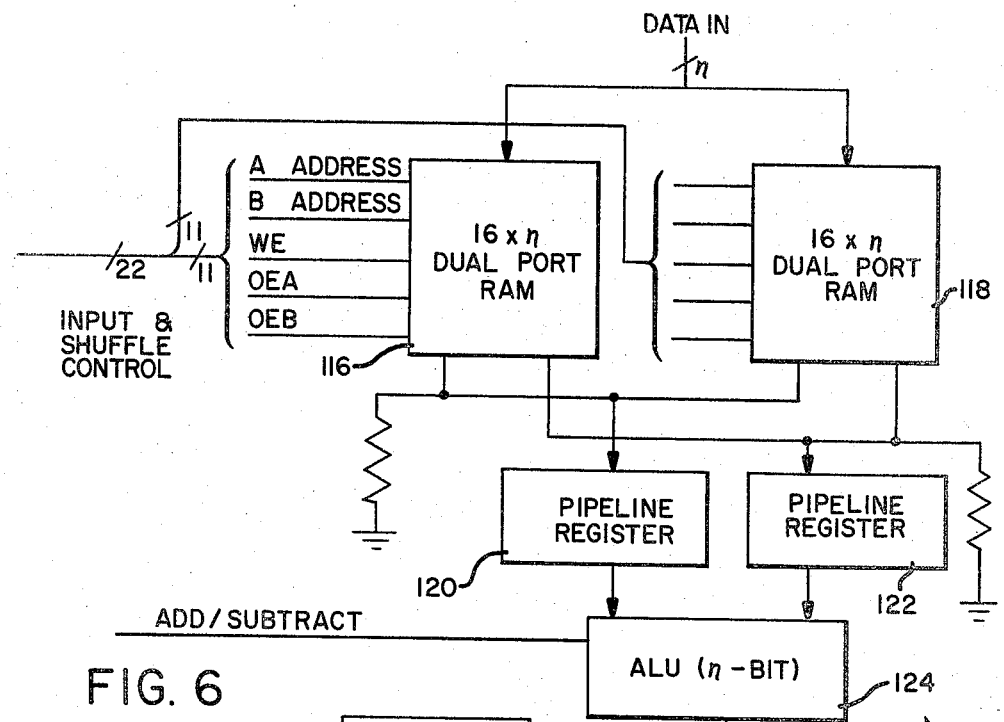
FIG. 6 is a block diagram of a shuffle and add module of the discrete cosine transformer of FIG. 5.

To better understand processor operation, consider FIG. 6 which shows shuffle and add modules 102, 104, 108. Data are loaded into one of the two 16-word dual-port RAM's 116, 118, such as the AMD29705. The other RAM is used for the shuffle and add operation. The roles of the RAM's 116 and 118 are interchanged every 16 clock cycles. These RAM's 116, 118 have two output ports, each of which may be independently connected to an addressable memory cell. Thus, to add $f_{1i}$ to $f_{1j}$, port A is addressed with an "i" and port B is addressed with a "j". Within one memory-access time, $f_{1i}$ and $f_{1j}$ will appear on the two output ports. It is necessary to latch the output of each RAM 116, 118 in a corresponding pipeline register 120, 122 at this point in order to achieve a cycle time short enough to handle data at the 8 M bit/sec. data rate. An arithmetic logic unit (ALU) 124 is set to "ADD", so that the resultant sum of the ALU 124 will be $f_{1i}+f_{1j}$ although sometimes it is set to "SUBTRACT" to produce a difference $f_{1i}-f_{1j}$. The next stage must store this resultant, since it will only remain stable until the next clock cycle. 23 lines from the PROM 114 are required to control this stage. Eleven lines go to each RAM 116, 118. These include four "A" port address lines, four "B" port address lines, a write-enable and an output-enable for each port. The twenty-third line determines whether the operation of the ALU 124 is "ADD" or "SUBTRACT". Whenever one of the ports is not enabled, its outputs are held low so that a "0" can be added. This allows transfer of data through the ALU 124 with no operation. It is required twice during each stage but the last; e.g., $f_{10}$ and $f_{115}$ are transferred directly to $f_{20}$ and $f_{21}$.

Figure 7:
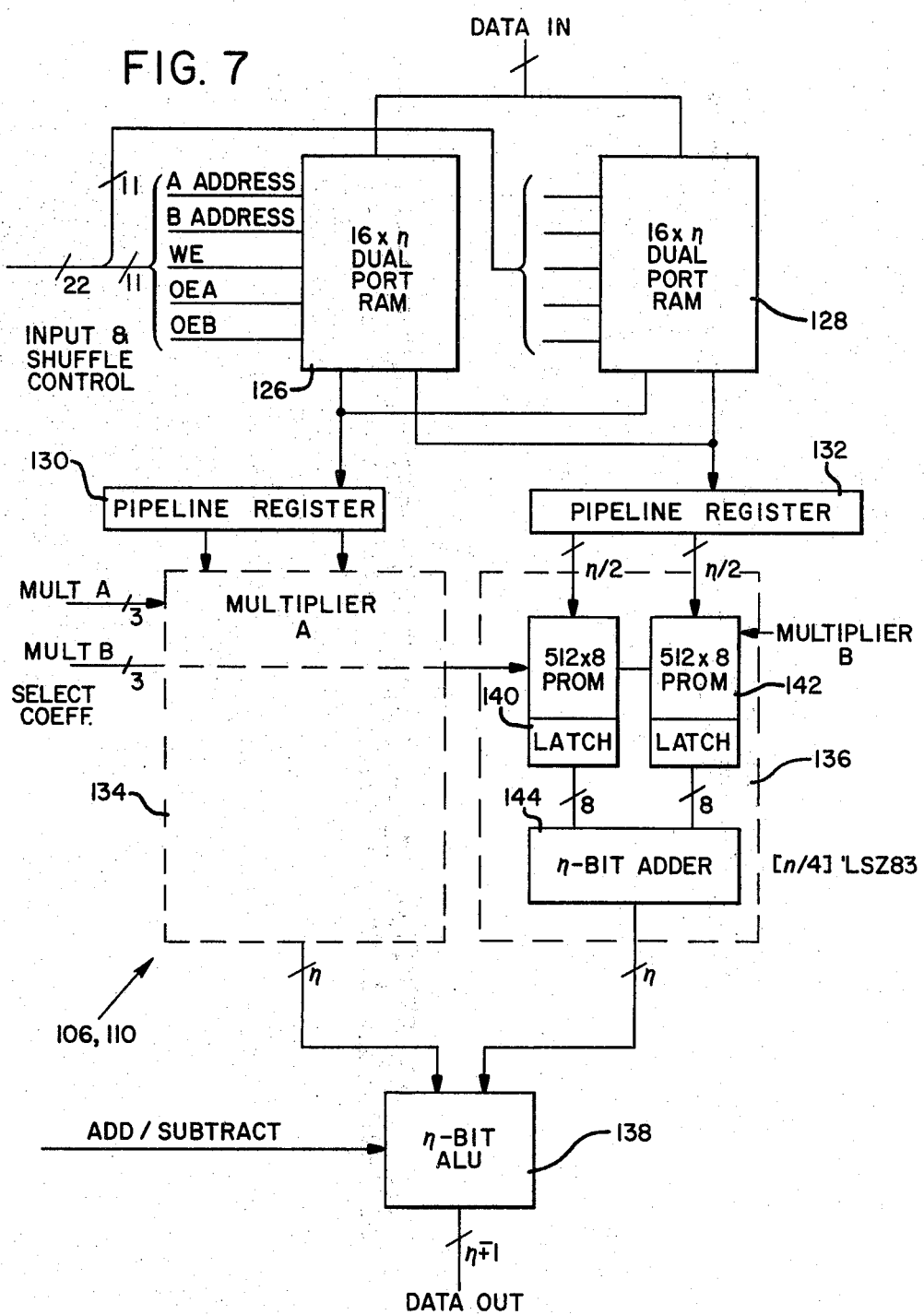
FIG. 7 is a block diagram of a shuffle, multiply and add module of the discrete cosine transformer of FIG. 5.

FIG. 7 shows a shuffle, multiply and add module. It is very similar to the shuffle and add modules 102, 104, 108. The shuffle multiply and add modules 106, 110 include two dual RAM's 126, 128 and pipeline registers 130, 132. A pair of multipliers 134, 136 has been included in series between each register 130, 132 and its input port to an ALU 138. Each multiplier (which must work faster than the maximum operating speed of single chip multipliers such as the AMD 25LS2516) includes two output latched PROMs 140, 142 and an n-bit adder 144.

The inclusion of the multipliers 134, 136 enables each data element to be multiplied by a coefficient prior to adding two products. Because of increased time required to accomplish a multiply operation, the PROMs 140, 142 are provided with pipeline registers in the form of the output latches therein.

In order to operate sequentially, the multiply operation must be accomplished once each cycle. Since NTSC signals must be sampled at 8.269 Mbit/sec., each cycle is 120.9 ns.

This configuration shown in FIG. 7 works because the data to be multiplied are never more than 10 bits wide, and they are always multiplied by a constant which can be selected by 3 bits (i.e., there are never more than 8 distinct constants per stage). The multiplicand is split into the 5 most significant bits and the 5 least significant bits. Each half is used to address a look-up table stored in the PROMs 140, 142. Stored in the look-up table are the partial-products of the 5-bit nibble and every possible coefficient (multiplier). The control PROM 114 generates a 3 bit address corresponding to the coefficient. The partial-products are added in the adder 138. The shuffle, multiply and add modules 106, 110 require 6 more control lines than the shuffle and add modules 102, 104, 108 in order to specify each of the multipliers.

The transform control PROM 114 is shown in FIG. 5. The PROM 114 generates each of the control bits during each cycle and the counter 112 addresses the PROM. The control cycle repeats every 32 clocks, and there are 127 lines to be controlled. Hence, the PROM 114 must be at least $32 \times 128$ bits. The speed of the PROM 114 is critical, since it is in series with all pipeline operations. A bipolar PROM with 25 ns access time has been chosen.

Corner Turning Strip Memory 62, 96

Figure 8:
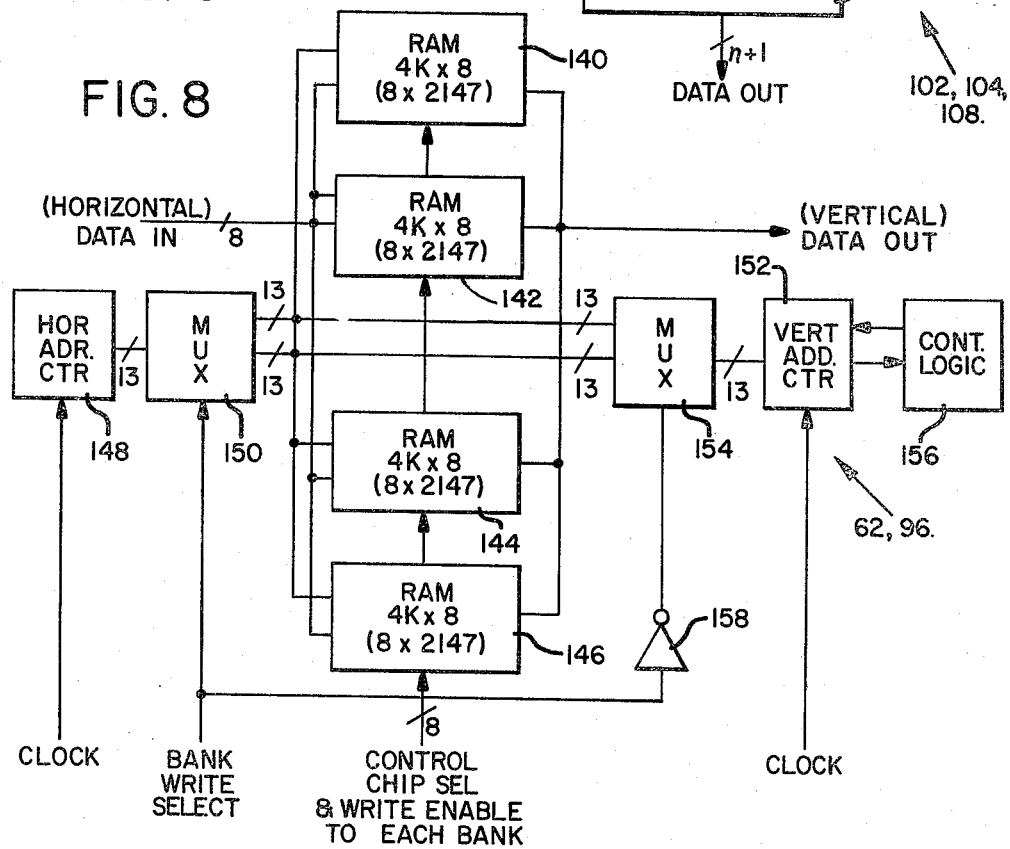
FIG. 8 is a block diagram of the strip memory in the luminance coder and decoder of FIG. 3.

The memory 62 in the transformer 18 (and memory 96 in the transformer 36) serves as a temporary buffer between the horizontal transform processor 60 and the vertical transform processor 64. Sixteen horizontal transforms are performed before the first vertical transform. As shown in FIG. 8, the memory 62, 96 comprises four RAMs 140, 142, 144, 146 configured as a double buffer, each buffer being large enough to store a full $16 \times 16$ block of coefficients. These four RAMs 140, 142, 144, 146 are flip-flopped so that, while one pair 140, 142 is being loaded from the horizontal transform processor 60, the other pair 144, 146 is providing the data to the vertical transform processor 64 (FIG. 3). When a full block has been loaded from the horizontal transform procesor 60 and the previous block has been read to the vertical transform processor 64, the function of the pairs is flipped so that the horizontal transform data just loaded into the RAMs 140, 142 will be read to the vertical transform processor 64 while the RAMs 144, 146 just emptied to the vertical transform processor 64 will be loaded from the horizontal transform processor 60. Each pair 140, 142 and 144, 146 is organized as a 4K by 16 bit matrix in order to carry 16 bits precision for the coefficient data, with 256 coefficients per block. A write address counter 148 which counts horizontally through the memory 62 is multiplexed by a write multiplexer 150 between the two pairs 140, 142 and 144, 146. Similarly, a read address counter 152 is connected through a read multiplexer 154 to count vertically through the two memory pairs. Control logic 156 enables the read address counter 152 to count vertically. An inverter 158 is provided in the "write select" line to control the read multiplexer 154.

Diagonal Access Memory 66, Diagonal Read In Memory 92

Figure 9:
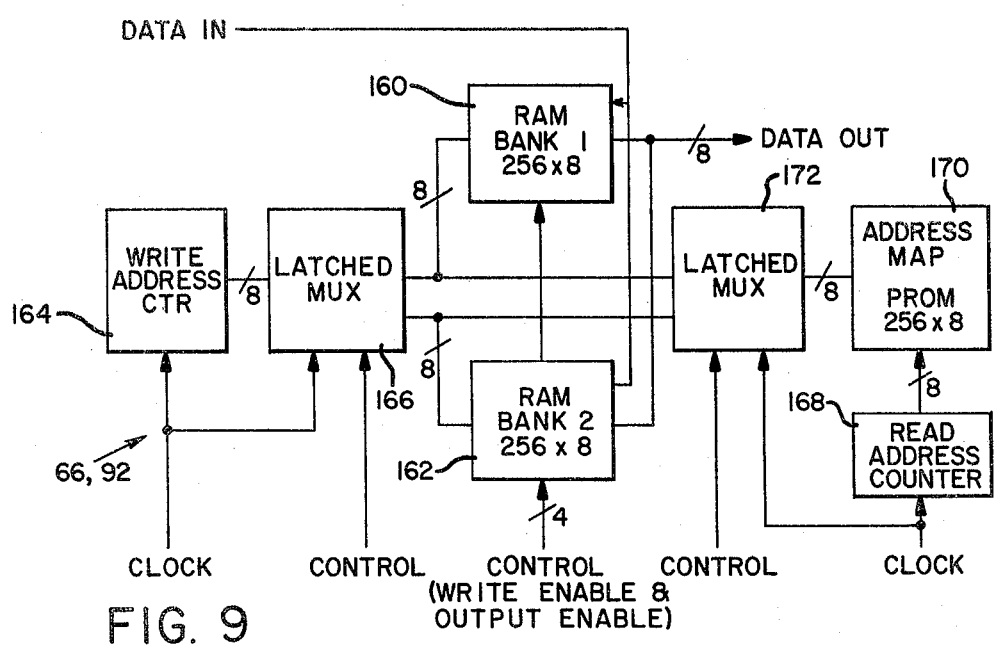
FIG. 9 is a block diagram of the diagonal access memory in the luminance coder of FIG. 3.
Figure 10:
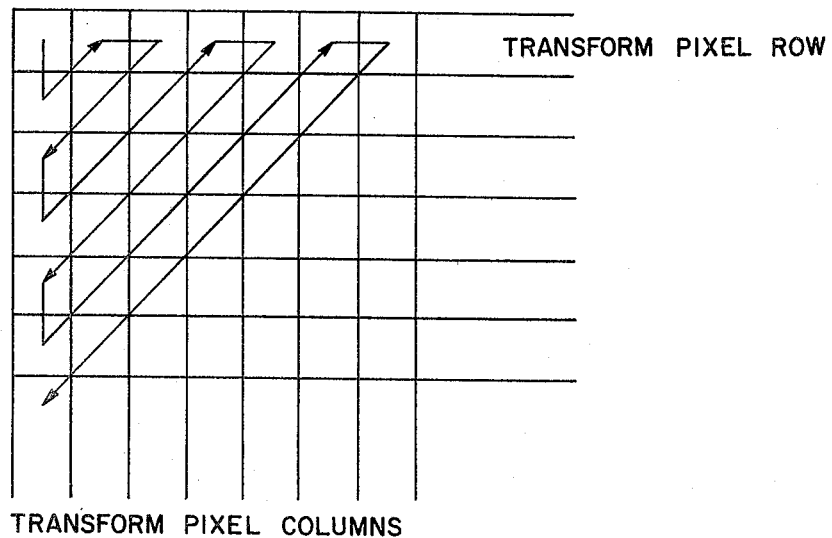
FIG. 10 is a functional graph of the operation of the diagonal access memory of FIG. 9.

The diagonal access memory 66 shown in the cosine transformer 18 of the luminance coder of FIG. 3 (and the equivalent diagonal read in memory 92 of the luminance decoder of FIG. 3) is shown in the detailed block diagram of FIG. 9. This memory 66 stores a 16 by 16 block of transformed coefficients in rectangular coordinate format (i.e., one 16-point column at a time). Each RAM bank 160, 162 must be read out in a non-rectangular format, such as illustrated by the diagonal tracing shown in FIG. 10. In order to accomplish diagonal (or more appropriately "non-rectangular" access) the memory includes a rectangular write address counter 164 connected to the bank 160, 162 through a latched multiplexer 166. A read address counter 168 addresses a PROM 170 in which a non-rectangular address map is stored. The address values stored in the PROM 170 are passed through a read multiplexer 172 to read the bank 160, 162 non-rectangularly or diagonally as shown in FIG. 10 (the ideal theoretical case). In practice, the actual read out will define a random pattern, as the coefficients resulting from (or supplied to) the vertical transform processor 64 (94) are in the order shown in the trellis diagram of FIG. 4. One of the RAM banks 160, 162 is loaded with a new pixel on every clock pulse. The loading address is generated by the write counter 164, incremented with each clock pulse. The other bank is read once each clock cycle from the address put out by the PROM 170 as it is addressed sequentially each clock cycle by the read counter 168. The memory 66 is under the control of the transformer timing and control module 68 (FIG. 3).

Transform Control Module 68,(100)

The transform control module 68, (100) shown in FIG. 3 generates all of the required control and clock signals for the transform processors 60, 64, (94), (98), strip memory 62, (96) and diagonal access memory 66 (diagonal read-in memory 92) of the transformer 18, (36). The module 68 accepts the pixel clock and the sync signals which identify the start of each field and line. It trims the field to 512 by 256 pixels per line, by counting six pixels before it starts the transform process, and by stopping the process 512 pixels later. It also ignores the first three lines in every field and stops the process after 256 lines. This module generates clocks and control signals for all other modules of the compressor system 10 (expander system 12).

Encoder 74

Figure 11:
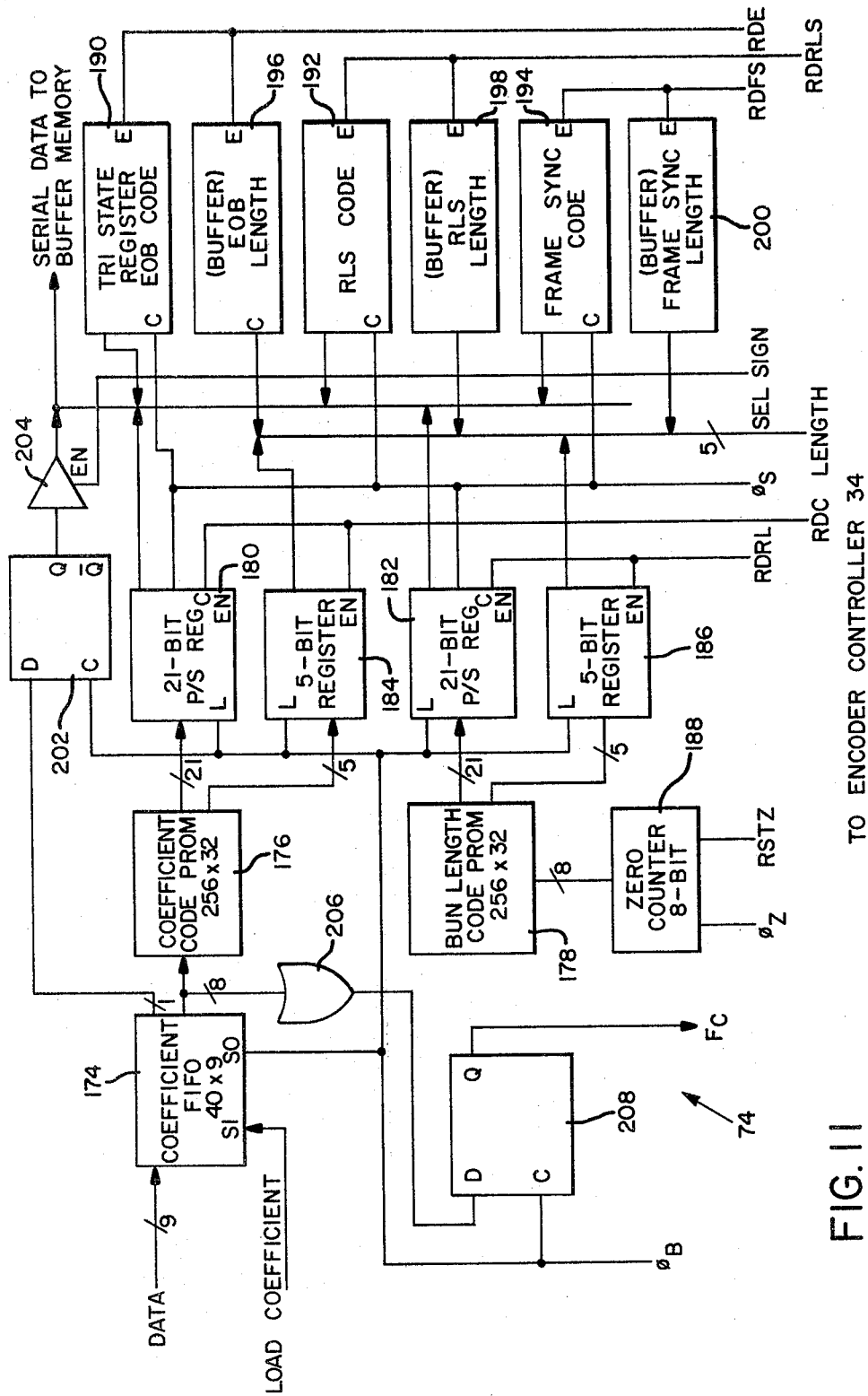
FIG. 11 is a block diagram of the encoder in the luminance coder of FIG. 3.

The encoder 74 is shown in the detailed block and logic diagram of FIG. 11. It accepts the normalized coefficients from the normalization multiplier 70 (described later in connection with FIG. 19) and encodes them in accordance with a variable length Huffman code. If the coefficients are zero, the encoder 74 counts the run length of zeros and encodes this number as a Huffman code.

Figure 12:
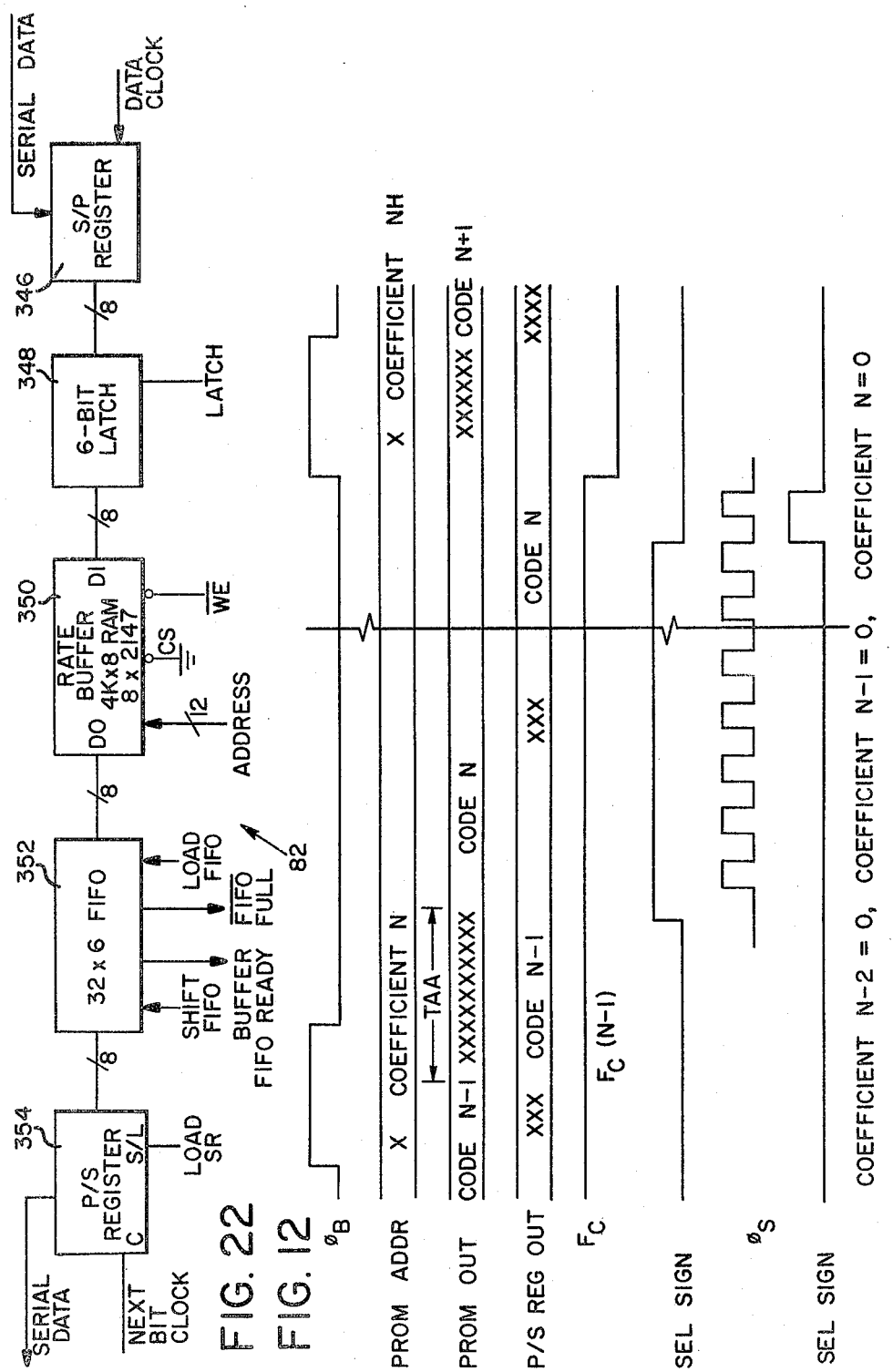
FIG. 12 is a timing diagram for a read coefficient code cycle of the encoder of FIG. 11.

The encoder 74 includes a coefficient FIFO memory 174 to buffer the speed variations between the COS transformer 18 and the encoder 74. Two 256-word PROMs 176, 178, respectively, store the Huffman codes corresponding to the coefficients and the run lengths of zero coefficient strings. Each PROM 176, 178 also stores a 5-bit word which is the length of the code word. To speed up the encoding process, each PROM 176, 178 is connected to a corresponding pipeline register 180, 182 which accepts up to 21 bits in parallel and shifts these out serially. A typical read sequence is shown in FIG. 12. The coefficient code PROM 176 accepts the 8 magnitude bits of the cosine coefficient as an address and outputs up to 21 bits of code plus 5 bits of length to a coefficient length register 184. The run-length PROM 178 accepts the run length as an address and outputs a similar code and length word to a zero coefficient length register 186. The run-length PROM 178 is addressed by a zero counter 188 which counts the run length of zero bit strings and selects a code corresponding to that length.

Three sets of tri-state registers 190, 192, 194 and associated buffers 196, 198, 200 are used to generate the end of block (EOB) run length start (RLS) frame sync (FS) codes. The cosine coefficient sign-bit is stored in a flip flop 202 and output through a tri-state buffer 204.

The encoder controller 76 generates a set of control signals which provide all clocks and enable gating signals to pop a new word out of the FIFO 174, advance the run length counter 188, latch the codes in the shift registers 180, 182 and so on. The encoder FIFO 174 output feeds an OR gate 206 and a flip flop 208 which generate a control flag $F_c$ which is input to the encoder controller 76.

The Encoder Controller 76

Figure 13:
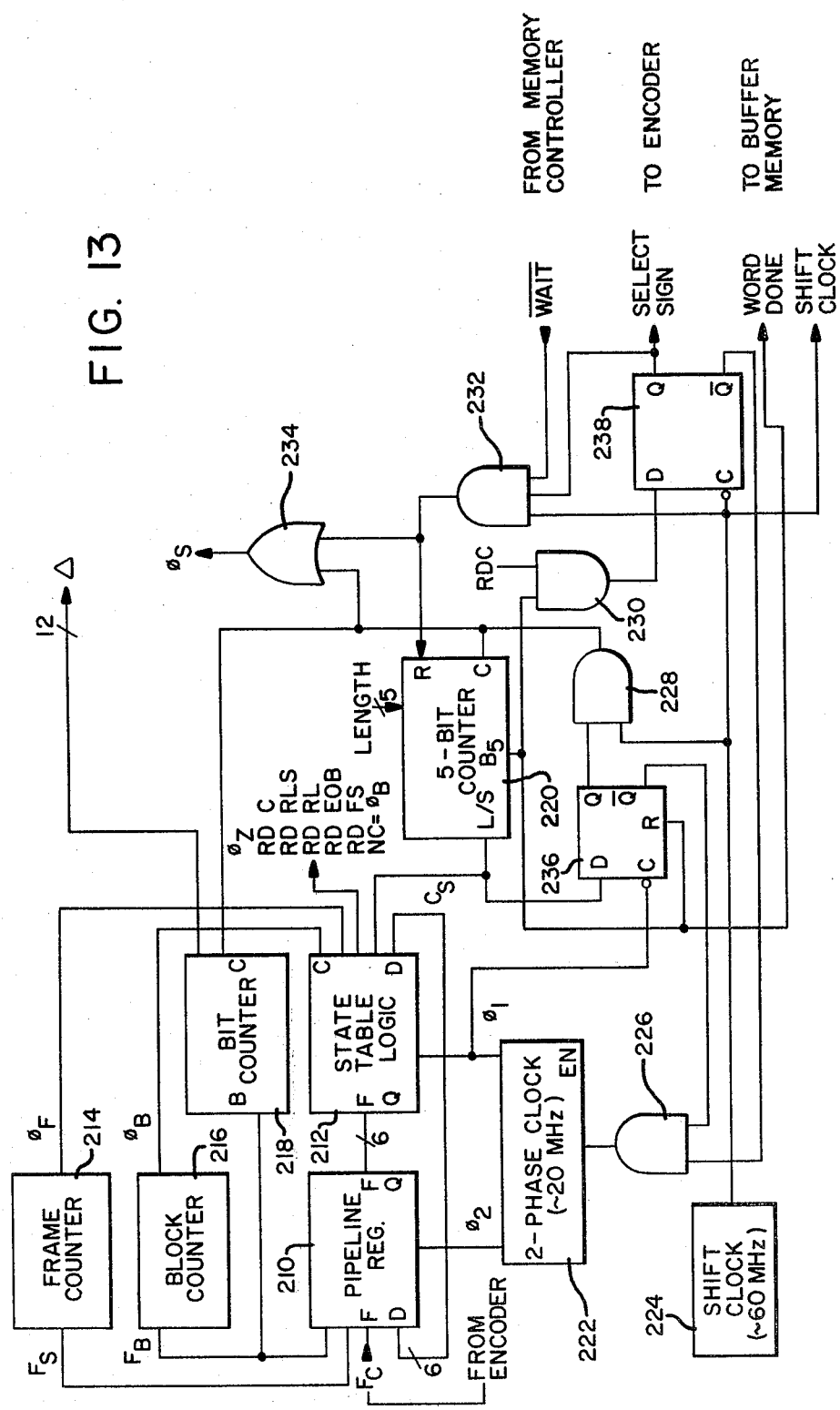
FIG. 13 is a block diagram of the encoder controller in the luminance coder of FIG. 3.

The encoder controller 76, a sequential state machine, is described structurally in FIG. 13. It implements the state diagram shown in FIG. 14. It includes a pipeline register 210 to hold the state, and a high speed Schottky state table logic element 212 to generate the next state and three flags $F_C$, $F_B$, and $F_S$ in accordance with and as shown in the state table of FIG. 16. The controller 76 further comprises a frame counter 214 to count picture frames, a block counter 216 to count blocks, a bit counter 218 to provide a bit count, and a length counter 220 to count length of end of bit, run length start and frame sync. A two phase clock 222, a shift clock 224, AND gates 226, 228, 230, 232, an OR gate 234, and two flip-flops 236, 238 are also part of the controller 76 and are interconnected as shown in FIG. 13. These logical elements provide the control signals required for the encoder 74.

The timing sequence for the controller 76 is shown in FIG. 15. Assume that the state held in the pipeline register 210 has just stabilized. Then, after a few nanoseconds of delay, both the next state and the control variables should have stabilized and are ready for use. The first phase of the two-phase clock 222 is used with the control variables to generate a set of pulses which advance counters, shift data, and so on in the encoder 74.

If a given state of the controller 76 requires that a code be read (e.g., "Read Coeff Code"), an appropriate pulse is put out to load the correct code into the encoder P/S register 180, and to jam the "Length" word into the preset length counter 220. The "length" word is $2^5$ (length in bits of code). The state machine 76 is temporarily halted by disabling its clock 222, and the code is shifted from the parallel to serial register 180. As it is shifted, the shift pulses are counted in the 5-bit length counter 220. When the counter 220 overflows, shifting is stopped, and the controller clock 224 is enabled.

A few nanoseconds after the control variables have been pulsed, the control action will be completed, and the flags will be stable. The second phase of the clock 224 latches the combination of next-state variables and flags which become the new input to the state table logic 212.

Rate Buffer Memory 78

Figure 17:
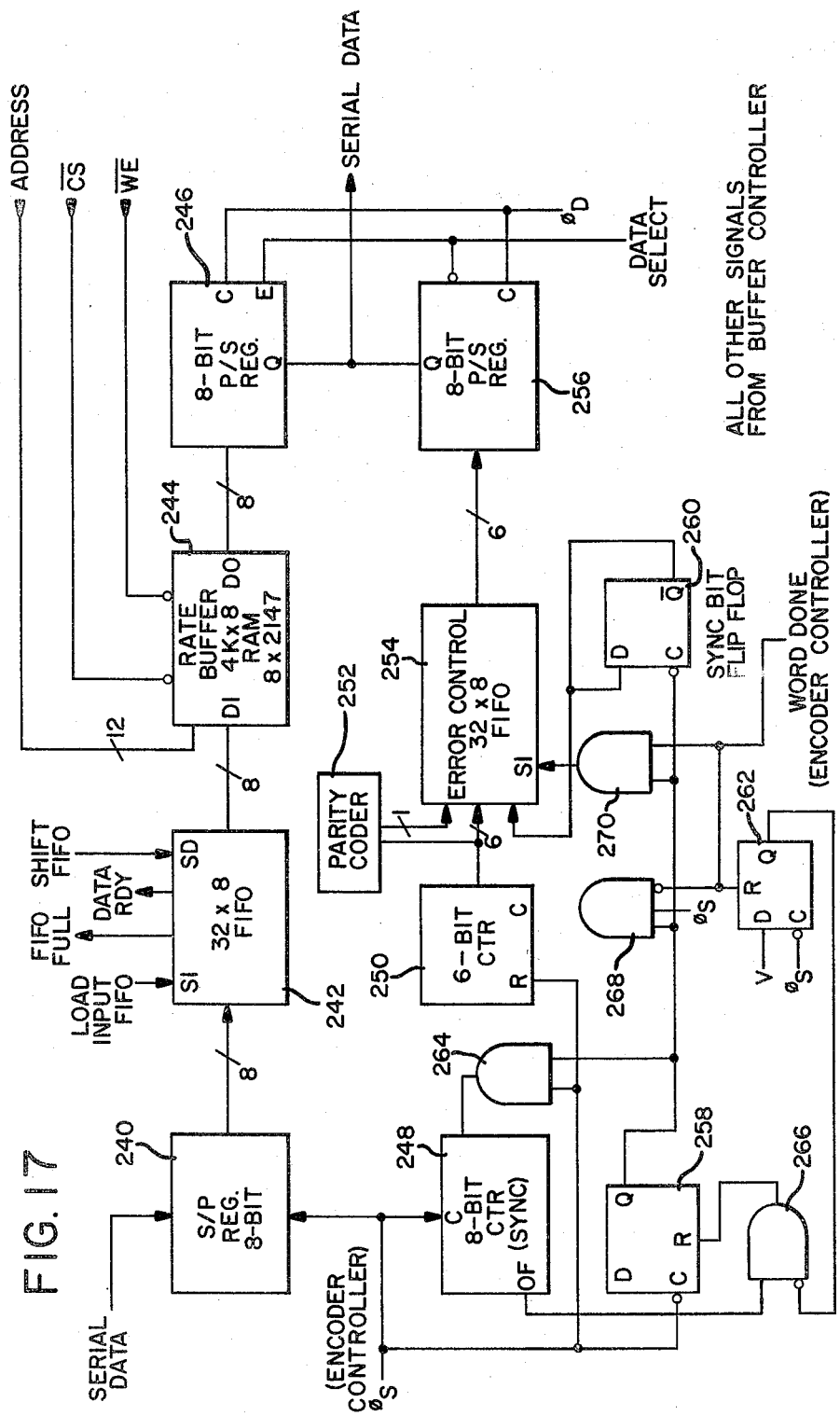
FIG. 17 is a block diagram of the rate buffer memory in the luminance coder of FIG. 3.

The rate buffer memory 78 is shown in block diagram of FIG. 17. The rate buffer memory 78 comprises an input register 240 which functions to convert the serial data from the encoder 74 into an eight-parallel-bit format which is supplied as a data input to a 32 bit by 8 bit FIFO 242. The FIFO 242 is supplied with two input control signals: load input FIFO and shift FIFO; and supplies two output flags: FIFO Full and Data Ready. The FIFO 242 supplies eight bit words stored therein to a 4K by 8 rate buffer memory array 244. The array 244 is a random access read/write memory and is supplied with a twelve bit address word, a negative chip select control signal ($\overline{CS}$) and a negative write enable (read/write) control signal. The output from the RAM 244, which is a parallel eight bit word, is supplied to an eight bit parallel to serial register 246 which functions to return the data to a serial format which is provided at a Q output as serial data. The serial to parallel register 240 is supplied with a clocking signal $\Phi_S$ from the encoder controller 76 while the output parallel to serial register 246 is supplied with a different clocking signal $\Phi_D$ also from the encoder controller 76. It is to be understood that the clocking signal $\Phi_S$ supplied to the input register 240 is a different asynchronous clocking signal from the clocking signal $\Phi_D$ supplied to the output parallel to serial register 246. Because the input data arriving at the serial to parallel register 240 may arrive at any time in the encoder output cycle, and the output data must be loaded into the output register 246 synchronously once every eight bits, the input data must occasionally wait to be written into the memory 244; for this reason the 32 by 8 bit FIFO 242 is supplied to compensate for such timing variations.

In the event that the luminance coder and decoder subsystem shown in FIG. 3 is used as a stand-alone compression system, error control will have to be provided by the scene adaptive coder 34. To provide such error control at the scene adaptive decoder 34, an eight bit sync word may be inserted between every 512 output bits of serial data from the eight bit parallel serial register 246 of the buffer memory 78. This word consists of alternating "sync" bit which is utilized to synchronize the decoder 34. Six bits of the word are a binary count to the first bit of the next Huffman Code and a parity calculated over the seven bits. Since the location of the first bit of the Huffman Code is available only at the encoder 74, the six "distance" bits must be counted as the data is input to the memory 244. Then the eight bit sync word must be stored until the proper time for insertion into the output serial data stream. This function is accomplished by the following elements shown in FIG. 17: an eight bit synchronous counter 248, a six bit counter 250, a parity coder 252, an error control 32 by 8 FIFO 254, and a second eight bit parallel to serial output shift register 256 which has its output connected in parallel with the output from the output shift register 246 in a tri-state bus configuration. The interleaving of the sync word with the serial data stream is timed and controlled by the memory controller 80 which will be described hereinafter. Additional logic elements are required for the proper functioning of the error control circuit and these include three D type flip flops, 258, 260, 262 and AND gates 264, 266, 268, and 270, all configured as shown in FIG. 16.

Buffer Memory Controller 80

Figure 18:
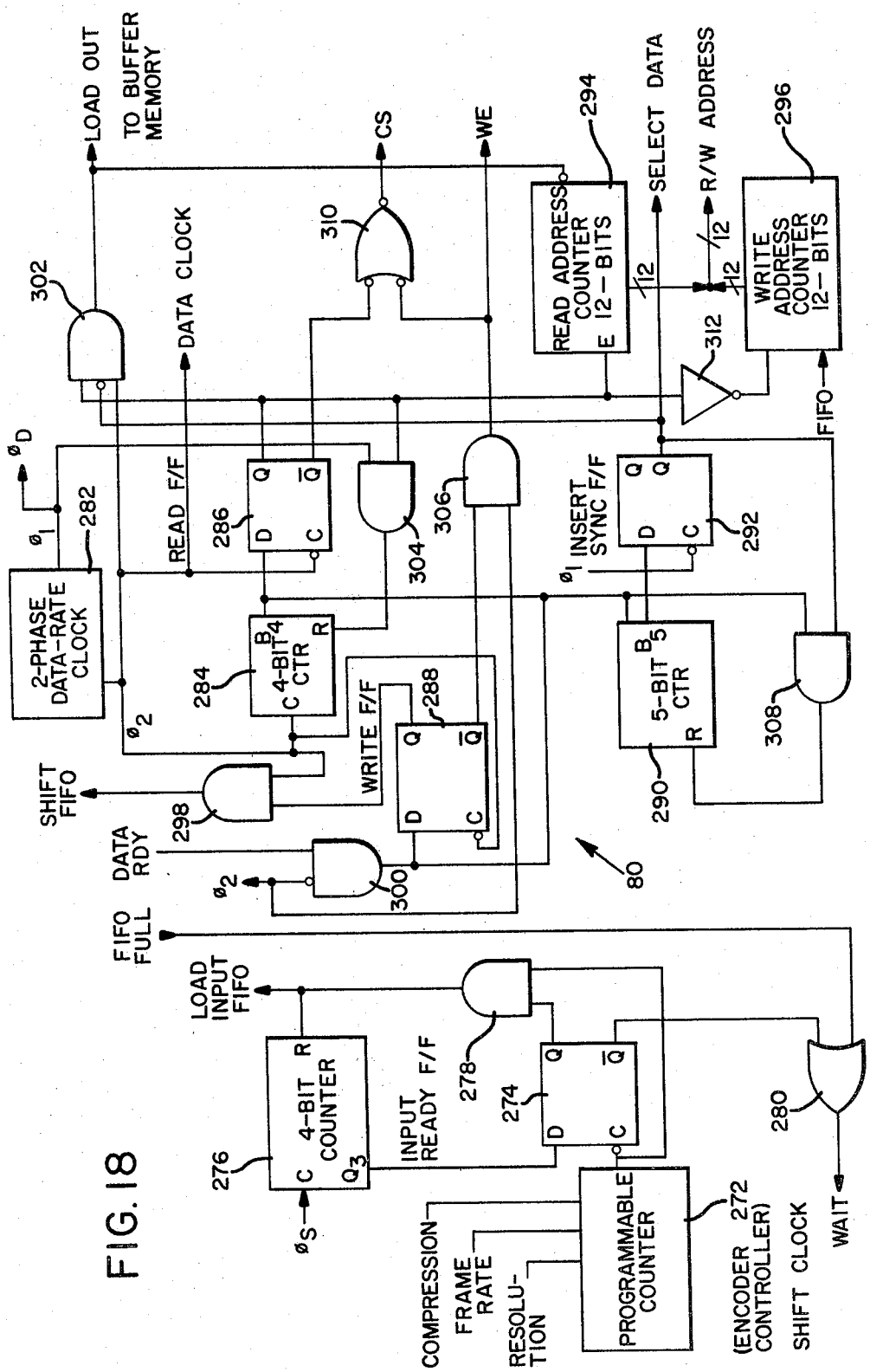
FIG. 18 is a block diagram of the buffer memory controller in the luminance coder of FIG. 3.

The buffer memory controller 80 is shown in the detailed block diagram of FIG. 18. The buffer controller 80 interfaces to the encoder controller 76 to assure that the encoder 74 does not try to shift data to the buffer memory 78 when it is busy. The controller 80 also interfaces to the multiplexer 28 (FIG. 1) accepting timing signals, so that the luminance data stream may be properly interleaved with the chrominance, sound and sync data. The controller 80 functions to generate the required control signals and clocks operate the buffer memory by accomplishing four sequences to be described below and shown in FIG. 19. These four sequences are output read cycle, sync insertion sequence, load input FIFO sequence, and input write cycle.

The buffer controller 80 provides a controller for the buffer memory FIFO 242 which includes a programmable counter 272, a flip flop 274, a four bit counter 276, an AND gate 278, and an OR gate 280 to provide the load input FIFO control signals to the FIFO 242 and generate a wait state when it is full.

Other elements of the buffer controller 80 include a two phase data rate clock 282, a four bit counter 284, a read flip flop 286, a write flip flop 288, a five bit counter 290, an insert sync flip flop 292, a read address counter of twelve bits 294, and a write address counter of twelve bits 296, to provide read/write addresses to the memory 78. Other control signal producing logic elements of the controller 80 include AND gates 298, 300, 302, 304, 306, and 308. An OR gate 310 and an inverter 312 make up the balance of logic elements for the controller 40. These elements 298-312 are configured as shown in FIG. 17 to produce the control signals desired.

Figure 19:
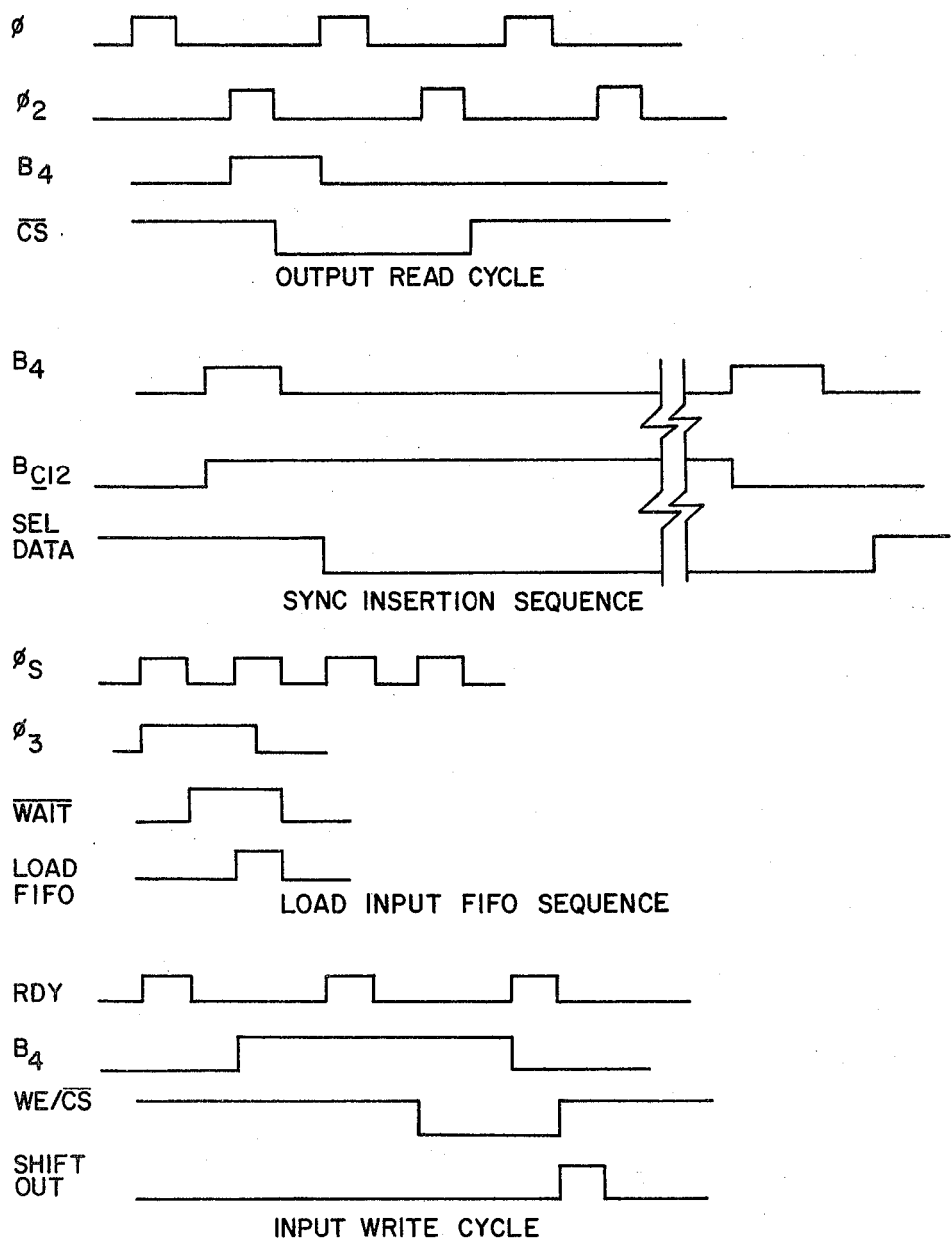
FIG. 19 is a timing diagram for control sequences of the buffer memory controller of FIG. 17.

As shown in FIG. 19, the output read cycle control sequence must be accomplished synchronously with the output data once every eight bits, and so it may be regarded as a master cycle taking precedence over the other cycles. As the buffer memory output register 246 (FIG. 17) is shifted, the shift pulses are counted by the four bit counter 284. When the eighth bit occurs, the counter 284 overflows and sets the read flip flop 286 which together with the two phase clock 282 generate the chip select (CS) and load shift register pulses. These pulses enable the buffer memory 244 to be read and to load the output shift register 246.

In the case of the stand-alone scene adpative coder sync insertion sequences are provided once every 512 bits (64 bytes). At such occurrence the sync word is interleaved into the data stream by operation of the sync word register 256. The output read cycle is inhibited for eight bits while the interleaving of the sync word is accomplished. The five bit counter 290 counts the output bytes and generates the required control signals when it overflows and sets the sync flip flop 292.

The load input FIFO sequence occurs when the buffer memory input shift register 240 fills which occurs once every eight bits. At this point, it is loaded into the FIFO 242. The four bit counter 276 counts the input bits and halts the encoding process long enough to load the FIFO 242 when the eighth bit occurs. If the FIFO fills, the encoding process is stopped by a wait state generated through the OR gate 280 until the word is loaded from the FIFO 242 into the memory 244.

The input write cycle occurs whenever the FIFO 242 has data ready to load into the memory 244 and it is not then being read. This cycle is initiated by the FIFO "data ready" signal supplied to the AND gate 300, passed through the flip flop 288 and returned to the memory 244 as a write enable (WE) signal from the gate 306. Also the inverting input of gate 248 is connected to the input of gate 254. The input read cycle is inhibited during the output write cycle.

The read address counter 294 contains the address of the next data output byte while the write address counter 296 points to the next input byte. The read address counter 294 is enabled and clocked whenever the output is read. The write address counter 296 is enabled and clocked whenever input data is written.

Rate Normalization Multiplier 70 and Processor 72

Figure 20:
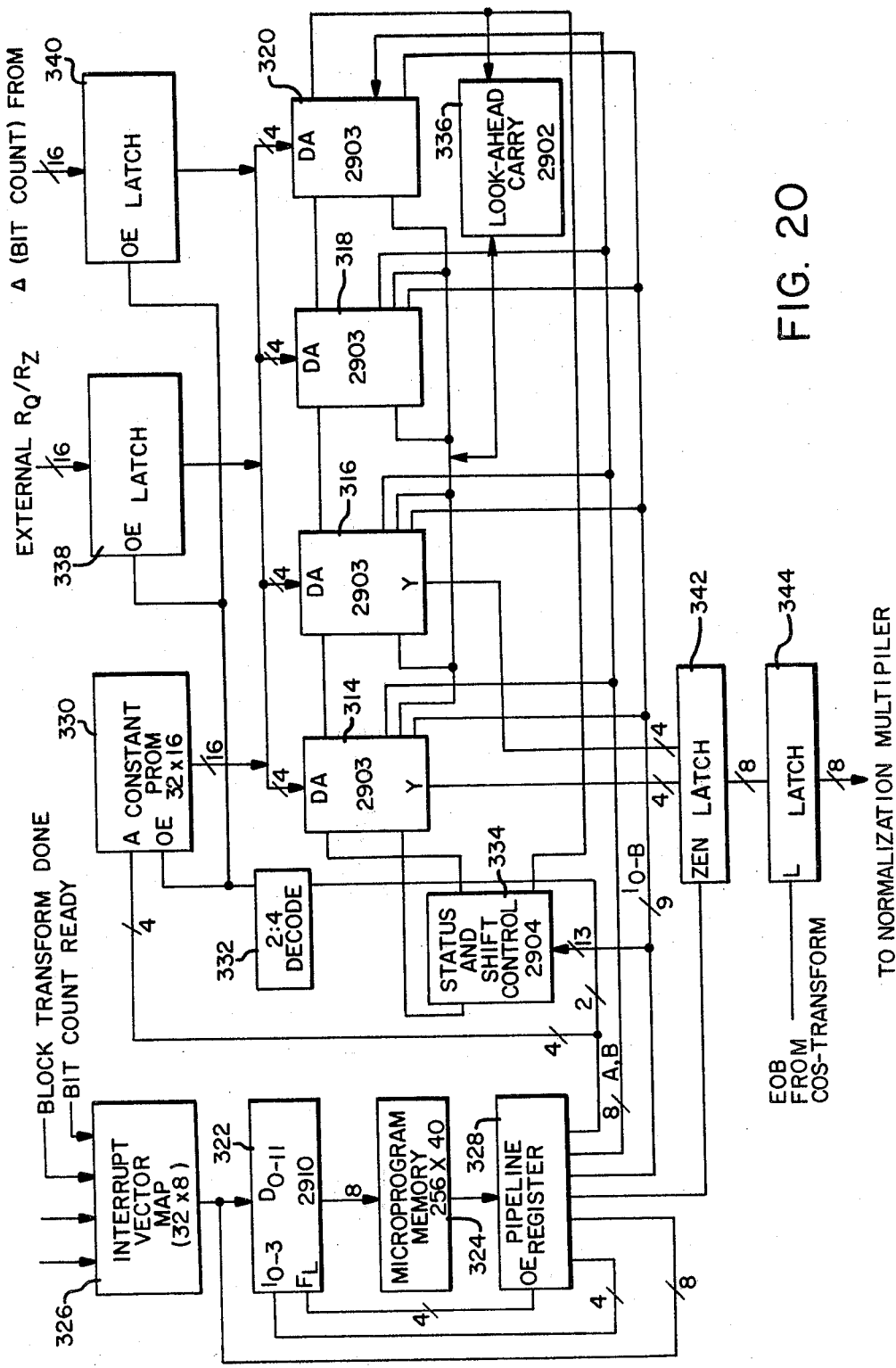
FIG. 20 is a block diagram of the rate normalization processor in the luminance coder of FIG. 3.

The buffer feedback controlled rate normalization multiplier 70 and processor 72 are shown in FIG. 20. Their function is to calculate the normalization factor $1/D_K$ for each block of the input transform coefficient in real time. The computation is based on the last value of D and the number of bits loaded into the rate buffer memory 78 during the last block or subframe. A simplified flowchart for the calculations made by the rate normalization processor 72 is set forth in FIG. 21. The calculations which must be made are based on the recursive relations $$D(K+1) = \Phi(k)^m D(k) \frac{S(k) - S(k-1)}{1.5 - S(k-1)} + D(k) \quad (18)$$

$$\Phi(k) = k + S(K)\,\text{sign}\,(S(k) - S(k-1)) \quad (19)$$

$$S(K) = S(k-1) + \Delta(k) - R_o/R_I \quad (20)$$

where (k) = Number of coded bits in block k
$R_o$ = desired synchronous output bit rate
$R_I$ = desired synchronous input bit rate The calculations set forth in the flow diagram of FIG. 21 require the use of eight to sixteen bit registers for storage of intermediate results and recursive constants. The calculations require the following arithmetic operations on two sixteen bit numbers: five additions, three multiplies and two divides.

The rate normalization processor 72 comprises four bipolar bit-slice MPUs 314, 316, 318 and 320, such as the AMD2903, as shown in FIG. 20. These four bit-slice processors 314, 316, 318, 320 are connected with lookahead carry and are used in a pipeline control architecture for maximum speed. A microprogram controller 322 (AMD type 2910) and a 256 by 40 bit microprogram memory 324 are provided to control the operation of the processors 314, 316, 318 and 320. The rate normalization processor 72 also includes a 32 by 8 bit interrupt vector map 326, a pipeline register 328, a constant PROM 330, a decoder 332, a status and shift control 334 (AMD type 2904), a look ahead carry 336 (AMD 2902), and four latches 338, 340, 342 and 344, all configured as shown in FIG. 20.

The processor 72 operates with four external interrupts: a power up restart, a change rate, a bit count ready, and block transform done, all supplied to the vector interrupt map 326. Each of these interrupts vector the program stored in the memory 324 to the appropriate subroutine shown in FIG. 21. The power up restart starts the initialization process which loads the initial values of the constants $R_o/R_I$, $D_o, D_I(1.5 - S^{-1})$ and $(S_o - S_{-1})$ into appropriate registers, and outputs $1/D_o$.

The "change rate" interrupt causes the processor 72 to read an external i/o port which contains the desired value of $R_o/F_I$, and then initializes all other constants. The change rate interrupt enables an operator to vary the input and output rates.

The bit count ready interrupt causes the processor 72 to input a new value of bit count (Δ), and calculates a new value of 1/D. This value is then stored awaiting the end of the block transform interrupt. This latter interrupt transfers the new value of 1/D to the output latch 344.

Scene Adaptive Decoder 34

Decoder Buffer Memory 82

The decoder buffer memory 82 is shown in the block diagram of FIG. 22 which reads from right to left. The expander buffer memory 82 functions to buffer the input serial data received from the communications channel 14 to accommodate the operation of the Huffman decoder 86, normalization multiplier 88 and processor 90, and inverse transformer 36 (FIG. 3). The buffer 82 converts the input serial data into a parallel format, stores the data and then reconverts the data back into a serial format. Thus, it includes a serial to parallel register 346, an eight bit latch 348, a rate buffer memory array 350, a 32 by 8 bit FIFO 352, and a parallel to serial register 354. Because of the speed of the data and the across time of the memory 350, the eight bit latch 348 is provided as a buffer between the serial to parallel register 346 and the rate buffer memory array 350. This latch 348 functions to pipeline input data into the memory 350. Furthermore, to put out data asynchronously as rapidly as needed and so as not to interfere with the input write cycle, the 32 word FIFO 352 is provided between the rate buffer memory 350 and the output parallel to serial register 354.

The control sequence is to write data into the memory 350, read data from the memory 350 and load the output shift register 354 as shown in the sequences timing chart in FIG. 23. The timing shown in FIG. 23 writes one eight bit byte and then reads none, one or two eight bit bytes while the input shift register 346 is accepting eight bits. Then the eight bit latch 348 latches the input data. The state of the output FIFO 352 determines how many bytes are read. When the output FIFO 352 is full, no more bytes will be read. Until the FIFO 352 is full, two bytes will be read as shown in FIG. 23. The FIFO 352 is emptied as rapidly as the Huffman decoder 86 can decode the data received from the register 354 and generate coefficients which will then be inversely transformed in the decoder transformer 36.

Decoder Buffer Controller 84

Figure 24:
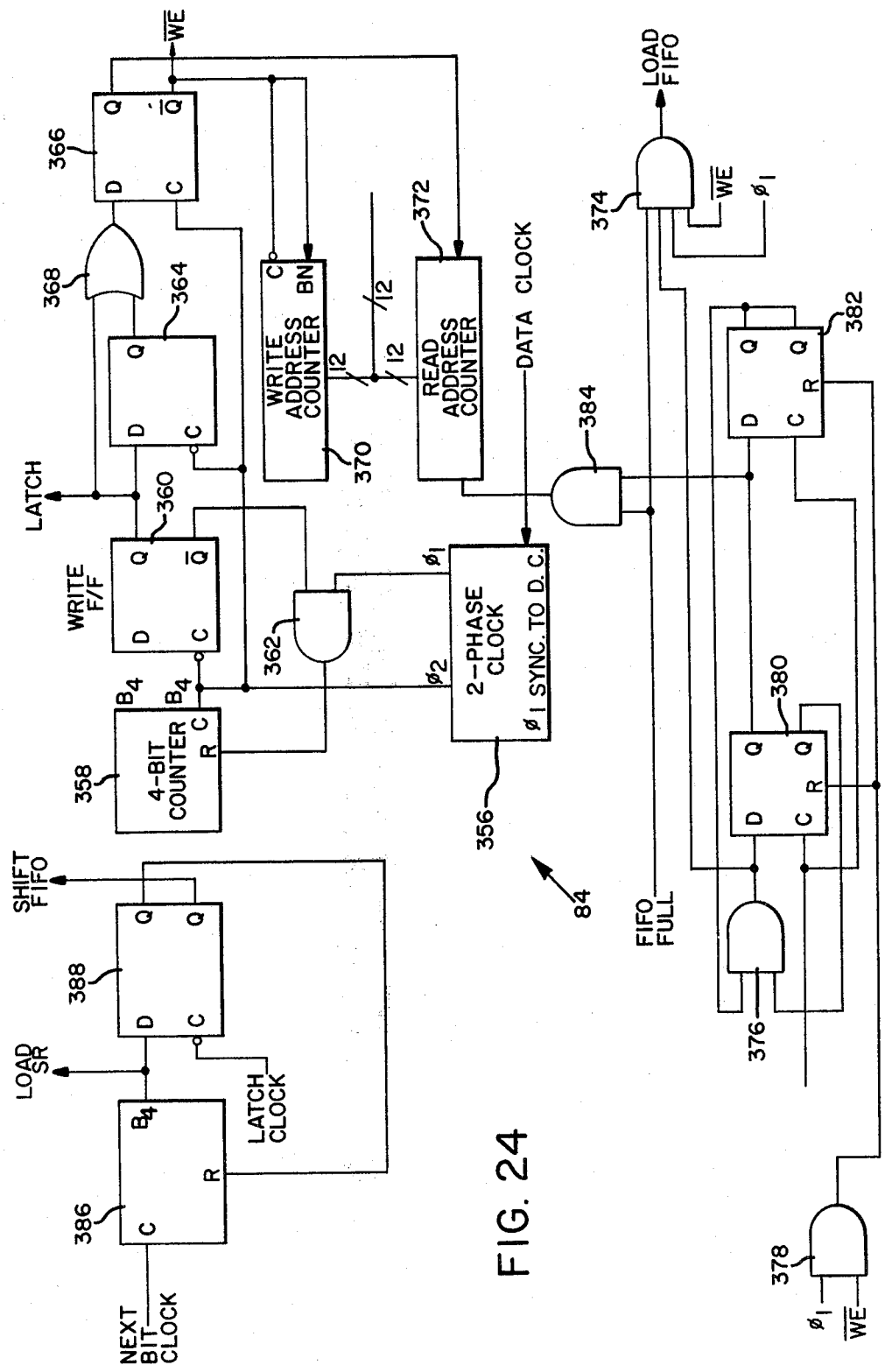
FIG. 24 is a block diagram of the receive buffer memory controller in the luminance decoder of FIG. 3.

The decoder buffer controller 84 is shown in FIG. 24. The controller 84 generates all of the timing signals necessary to control the decoder buffer memory 82.

The controller 84 includes a two phase clock 356 synchronized to the data clock and the logic elements required to generate the control signals shown in FIG. 22. Thus, the controller 84 includes a four bit counter 358, a write flip flop 360, and an AND gate 362 which provide the latch control signal. Two flip flops 364 and 366 along with an OR gate 368 are configured to provide a write enable ($\overline{WE}$) control signal. A write address counter 370 and a read address counter 372 provide the necessary addressing for the memory array 350 (FIG. 22).

The load FIFO signal is provided by the combination of AND gate 374, 376, and 378 along with two flip flops 380 and 382. The operation of the read address counter is enabled by an AND gate 384. The load shift register signal is provided by a counter 386 to which a flip flop 388 is connected to provide the shift FIFO control signal.

Synchronizer

A synchronizer, not shown, would be connected to the memory 82 and controller 84 to decode error control sync generated by the scene adaptive coder in a standalone system. It would monitor the input data stream to obtain sync from the error control byte inserted by the coder 20 as described above. The synchronizer would also read the six bit portion of the sync word which contains the count to the start of the next Huffman code. The synchronizer would generate a signal which resets the Huffman decoder 86 to a "start" state thus assuring periodically that it is and remains in sync with the incoming data. Preferably, the synchronizer is implemented as a high speed hardware processor.

Huffman Decoder 86

Figure 25:
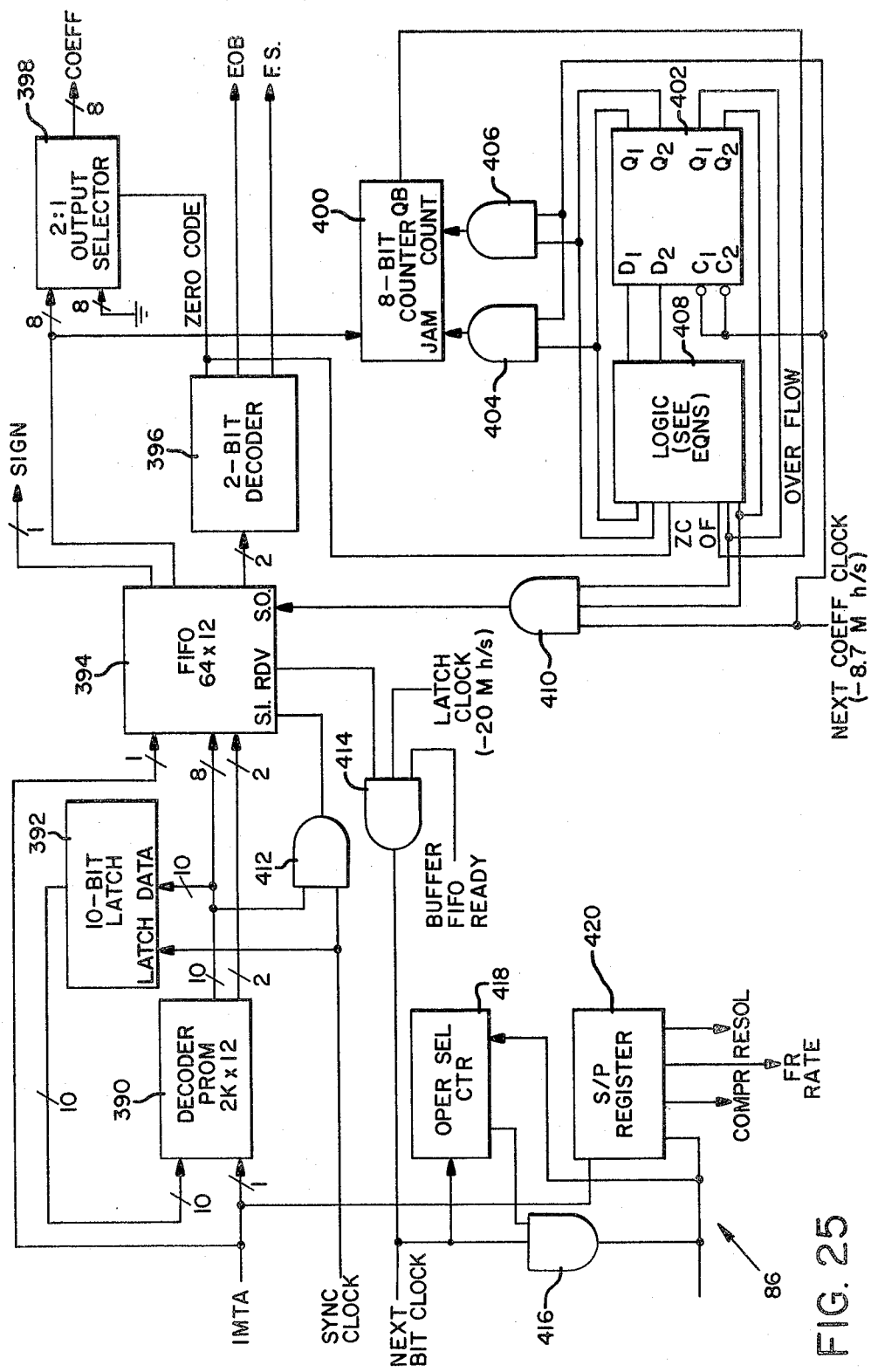
FIG. 25 is a block diagram of the Huffman decoder in the luminance decoder of FIG. 3.

The Huffman decoder 86 is shown in the detailed block and logic diagram of FIG. 25. A decoder state diagram for a typical Huffman code is shown in FIG. 26. As will be appreciated by reference to FIGS. 25 and 26, the decoder 86 has been implemented as a finite state machine which functions instantaneously to decode each bit as it is received. This approach is required because the data arriving at the decoder 86 from the buffer memory 82 (and synchronizer) is in a serial data stream format of a sequence of Huffman codes which must be decoded very rapidly. The Huffman code results in coefficient words at variable length. The length is not known to the decoder 86 until the word has been decoded.

With reference to FIG. 25, the decoder is seen to include a decoder PROM 390 which receives the input data in serial format, a ten bit latch 392 which functions to address the decoder PROM 390, a FIFO 394 which receives decoded coefficients from the decoder PROM and stores them, a two bit decoder 396 which functions to decode the end of bit signal (EOB) and frame sync signal (FS), an output selector 398 which receives eight parallel bits from the FIFO 394 or eight zero bits and selects between them in accordance with the nature of the output coefficient. The encoder 86 further includes an eight bit counter 400 to which a dual D flip flop 402 and two AND gates 404 and 406 are connected, a logic element 408 which implements the following logic equations:

$$D_1 = (\overline{Q_1} \cap Q_2 \cup \overline{Q_1} \cap \overline{Q_2} \cap ZC) \tag{21}$$

$$D_2 = (\overline{Q_1} \cap Q_2 (\cup) Q_1 \cap Q_2 \cap \overline{OF}), \tag{22}$$

and a three input AND gate 410 which is connected to the shift out input of the FIFO 394.

Additional circuitry of the decoder includes three AND gates 412, 414 and 416, an operator selector control circuit 418, and a serial to parallel register 420 which provides outputs for compression, frame rate and resolution control.

The decoder 86 sequentially decodes the input serial bit stream, one bit at a time with the 2K by 12 PROM 390 which implements the state diagram of FIG. 26. From the state diagram, it is clear that a decision of the new state can be made knowing old state and the next bit. The output of the decoder 86 is captured in the latch 392 and is used with the next bit to address the PROM 390 which implements the state diagram of FIG. 26. The new state has been preprogrammed into the PROM 390 and it is then put out as the old state for the next bit. The latch 392 must be strobed once per bit, if the bit is to be decoded, and so it is connected to the sync clock input. The decoder 86 must decode two Huffman codes, each with 256 words. It can be shown that a "tree" diagram, such as that shown in FIG. 26, requires less than 512 states to decode a 256 word code, hence a total of 1K states are required, no more. The states are numbered so that the least-significant eight bits of the ten bits determining the state for the terminal states are either the coefficient of the coded cosine coefficient, or they are the run length of the run length, depending on the code word. When a terminal state is reached, as shown in the timing diagram of FIG. 27, the eight least significant bits and two control bits are loaded into the FIFO. The next data bit is also loaded into the FIFO 394.

The two control bits are used to designate the nature of the code word: frame sync, end of block, coefficient, or run length. These are programmed into the PROM 390 as part of the state diagram implementation shown in FIG. 26.

The FIFO 394 acts to separate the operation of the decoder 86 which must operate asynchronously from the inverse cosine transformer 36 which operates synchronously with the video output.

When a word reaches the end of the FIFO 394, the control bits are decoded by the two bit decoder 396 to generate the end of bit and frame sync signals. If a run length has been decoded, the appropriate number of zero value coefficients are generated by operation of the eight bit counter 400, dual D flip flops 402 and logic 408. These coefficients are inserted into the coefficient stream by operation of the two to one output selector 398. The timing sequence for zero insertion is shown in FIG. 28.

Chrominance Encoder 22, Decoder 38

Figure 29:
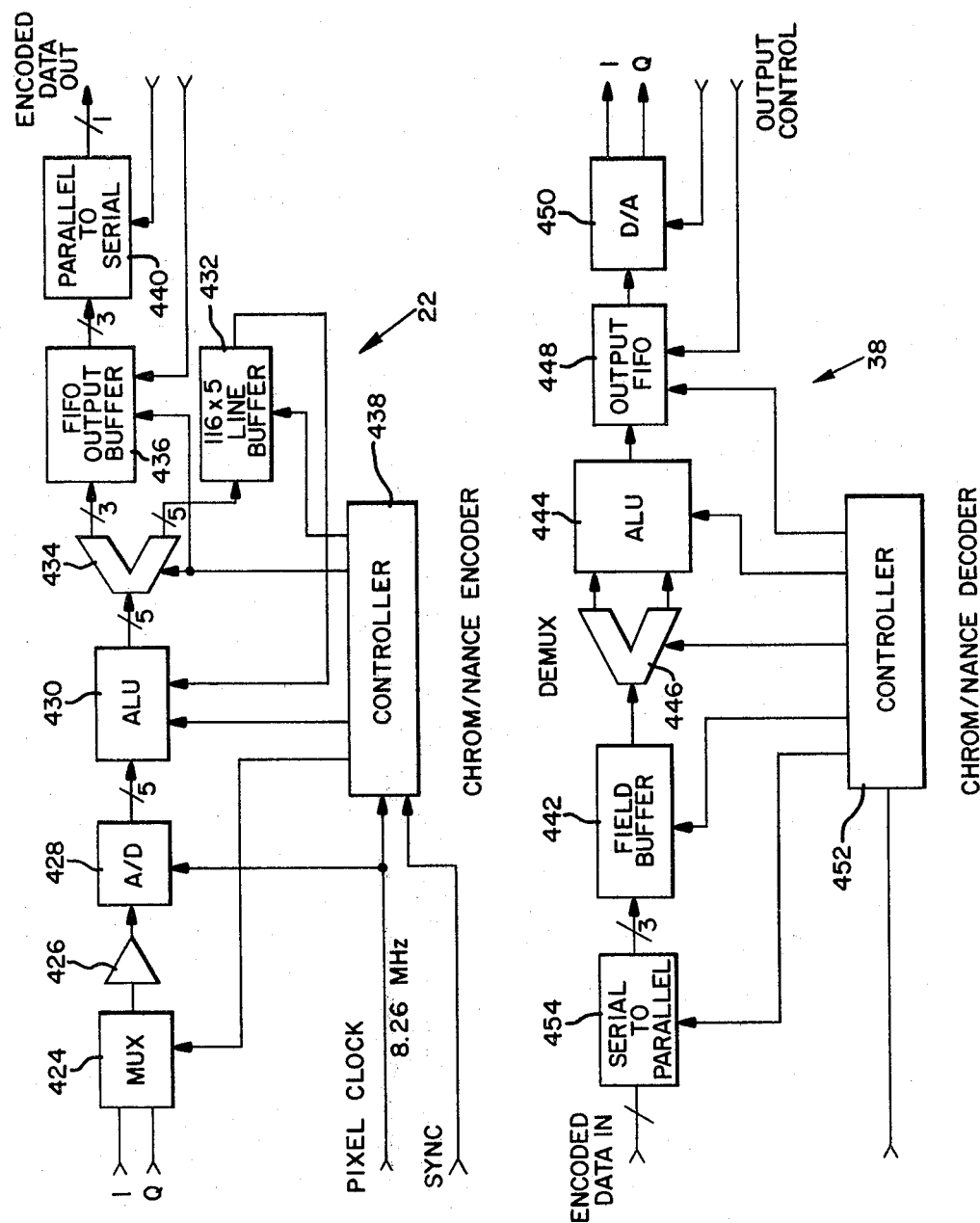
FIG. 29 is a block diagram of the chrominance encoder and chrominance decoder of the system of FIG. 1.

The chrominance encoder 22 and chrominance decoder 38 are shown in FIG. 29. The encoder 22 operates on the separated I and Q analog signals to produce an encoded digital bit stream at an average rate of 0.375 bits per pixel. This is accomplished by sampling I and Q chrominance components at the full bandwidth pixel rate with eight quantization levels per pixel. The digitized chrominance is then filtered and down-sampled along the scan line to achieve a 4 to 1 bit rate reduction. Filtering in the vertical dimension is achieved by averaging pairs of lines, and temporal filtering is realized by recoding only I data for, e.g., odd-line fields and only Q data for even-line fields. The chrominance signals are sampled at full bandwidth rates and all filtering operations are performed digitally using finite impulse response techniques capable of perfect phase linearity.

In the chrominance encoder 22, the I and Q chrominance signals are first applied to a 2 to 1 multiplexer 424 which selects the I signal for odd line fields and the Q signal for even line fields. This selection is followed by a buffer amplifier 426 which provides a low source impedance signal to an analog to digital converter 428. A high speed parallel or flash 3 bit converter 428 is used which eliminates any need for a sample and hold circuit. Standard modules such as the Datel MX808 multiplexer, AM-102A buffer amplifier and HU38MC A/D are used for the multiplexer 424, amplifier 426 and converter 428.

The digitized data are averaged along the scan line in blocks of 4 pixels and vertically over two lines by an ALU 430 formed, for example, of two 74LS181 integrated circuits and associated control logic. On the first scan, i.e., one to be averaged within a field, 4 pixels are added to form a 5-bit sum which is stored in a line buffer 432 after passing through a multiplexer 434. The process is repeated for all 464 pixels to be processed in a line, on the next scan in the field, the 4 pixel sums are formed as before and added to the corresponding sum from the line buffer 432 to form a 6-bit sum of 8 pixels. The three most significant bits of this 8 pixel sum are then loaded from the ALU 430 to an output FIFO buffer 436 via the multiplexer 434. A controller 438 for the ALU 430 and an output parallel to serial shift register 440 are also required for the encoder 22, as shown in FIG. 29.

The chrominance decoder 38 shown in FIG. 29 performs the inverse function of the encoder 22. Since the I chrominance component is encoded and transmitted for, e.g., the odd-line fields and the Q component for the evenline fields, it is necessary to store in a field buffer memory 442 the previous field of chrominance data (in compressed form) to provide the I and Q data for each reconstructed pixel. Every other line in the regenerated field is interpolated from its adjacent lines. This interpolation is accomplished with a single ALU chip 444 which is connected to the field buffer 442 through a latching demultiplexer 446. The reconstructed line chrominance data (still compressed 4 to 1 horizontally) is fed to an output FIFO buffer 448 for sequential I, Q pairs. These data are then retrieved from the FIFO 448, demultiplexed into separate I and Q channels, expanded horizontally and converted to the analog domain in a digital to analog converter 450. A controller 452 and an input serial to parallel shift register, buffer 454 are also required for the decoder 38 in the configuration shown in FIG. 29.

Multiplexer 28, Demultiplexer 32

As shown in FIG. 30, the multiplexer 28 (FIG. 1) accepts the three coded signals: luminance, chrominance and sound, into three FIFO buffer memories 456, 458, 460. The outputs of these memories 456, 458, 460 are combined with a sync word from a sync generator 462 into a single composite data stream by a selector 464. Video sync is carried within luminance data. (If the scene adaptive coder 20 and decoder 34 are configured as a stand-alone system, the sync word would be provided by the buffer memory 78 and a synchronizer in the decoder 34, as already mentioned.) A five bit frame counter 466 and a selector control PROM 468 are provided to the selector 464.

The demultiplexer 32 accepts the data stream, and it separates out the sync word with a synchronizer 470 which synchronizes operation of the entire expander 12 to the incoming data stream. The incoming data is provided to selector 472 which separates luminance, chrominance and audio data and loads the data into three elastic buffers 474, 476, 478. These buffers are emptied at a constant rate by the scene adaptive decoder 34, the chrominance decoder 38 and the audio decoder 42 (FIG. 1) already described. The selector 472 requires a five bit frame counter 480 and a selector mapping PROM 482, for locating sync words and directing data to the FIFOs 474, 476, 478.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A method for one pass compressing, transferring through a medium and expanding in real time digitalized television video frames, the compression steps comprising:

(a) dividing each digitalized frame into a predetermined matrix of sub-frames;

(b) performing a predetermined spatial domain to transform domain transformation in two dimensions of the picture elements of each sub-frame to provide transform coefficients thereof;

(c) storing said transform coefficients in a memory at a rate related to the video frame rate;

(d) normalizing said transform coefficients by operation of a normalization factor having a predetermined compression ratio component to perform threshold coding of said transform coefficients and an adaptive rate buffer capacity control feedback component, to provide compression and to provide normalized transform coefficients compatible with a predetermined data coding scheme including Huffman coding of amplitude coefficients and run length coding of zero amplitude coefficients following coefficient normalization;

(e) coding said normalized transform coefficients in accordance with said predetermined data coding scheme for further compression and transfer through said limited bandwidth medium;

(f) loading said coded coefficients into an encode rate first in, first out buffer memory asynchronously at a high data transfer rate;

(g) unloading said coded coefficients from said encode rate buffer memory at a slow data transfer rate capable of passing through said limited bandwidth medium; and (h) adaptively determining said rate buffer capacity control feedback component in relation to the instantaneous data content of said rate buffer memory in relation to its capacity, to control at said normalization step the absolute quantity of data resulting therefrom so that said rate buffer memory is never completely emptied and never completely filled, and combining said feedback component with said compression ratio component to provide said normalization factor; and, the expansion steps comprising:

(i) loading said coded coefficients into a decode rate first in, first out buffer memory at said slow synchronous data transfer rate;

(j) unloading said coded coefficients from said decode rate buffer memory asynchronously at a high data transfer rate;

(k) decoding said coded coefficients in accordance with an inverse of said predetermined data coding scheme;

(l) inversely normalizing said decoded transform coefficients by operation of an inverse normalization factor having a predetermined expansion ratio component and an adaptive decode rate buffer capacity control feed forward component, to provide expansion of said transform coefficients;

(m) adaptively determining said rate buffer capacity control feed forward component in relation to said instantaneous data content of said decode rate buffer memory in further relation to its capacity so as to control at said inverse normalization step the absolute quantity of data resulting therefrom and thus the rate at which said coded coefficients are unloaded asynchronously from said decode rate buffer memory so that it is never completely emptied and never completely filled, and combining said feed forward component with said expansion ratio component to provide said inverse normalization factor;

(n) performing the inverse of said predetermined transformation of said expanded transform coefficients to provide reconstituted picture elements of each sub-frame;

(o) assembling said sub-frames into said predetermined matrix and putting them out at said video frame rate so as to reconstruct digitalized picture frames closely approximating the corresponding original video frames.

2. A system for one pass compression and expansion of digitalized video sub-frames in the line scan format in real time including a compressor and an expander, said compressor comprising:

two dimensional spatial domain to transform domain transformer means for performing a predetermined transformation of the picture elements of each subframe which will provide two dimensional transform coefficients thereof, normalization means connected to said transformer means for multiplying said transform coefficients by a normalization factor having a predetermined compression component and an adaptive rate buffer capacity control feedback component to provide compression and to provide normalized transform coefficients compatible with a predetermined data coding scheme, encoder means for encoding said normalized transform coefficients in accordance with said predetermined data coding scheme including Huffman coding of amplitude of coefficients and run length coding of zero amplitude coefficients for further compression and transfer through a limited bandwidth medium to said expander, rate buffer memory means connected to said encoder means for storing said coded coefficients in said memory means asynchronously at a high data transfer rate, for putting out said coded coefficients at a slow synchronous data transfer rate capable of passing through said limited bandwidth medium, and for adaptively determining said rate buffer capacity control feedback component in relation to the instantaneous data content of said rate buffer memory means, in further relation to its capacity, to control at said normalization means the absolute quantity of data resulting from the operation thereof so that said rate buffer memory means is never completely emptied and is never completely filled;

said expander comprising:

second rate buffer means connected to said limited bandwidth medium to receive said coded coefficients at said slow synchronous data transfer rate, for putting out said coded coefficients at an asynchronous high data transfer rate, and for determining a rate buffer capacity control feed forward component in relation to said instantaneous data content of said second rate buffer memory means in further relation to its capacity so as to control the absolute quantity of data contained therein, decoder means connected to said second rate buffer memory means for decoding said coded coefficients in accordance with the inverse of said predetermined data coding scheme;

inverse normalization multiplier means for inversely normalizing said coded transform coefficients by operation of an inverse normalization factor having a predetermined expansion ratio component, and said rate buffer capacity control feed forward component to provide expansion of said transform coefficients in relation to the instantaneous absolute quantity of data contained in said second rate buffer memory means;

inverse discrete two dimensional transformer means connected to said inverse normalization multiplier means for performing the inverse of said predetermined transformation of said expanded transform coefficients, to provide reconstituted picture elements of each subframe in line scan format.

3. In a one pass digitalized video compression and expansion system enabling digitalized video to be passed through a limited bandwidth communications path, a compressor comprising:

a compressor input connected to receive digitalized data in line scan format and at a synchronous rate related to the video sync, said data corresponding to subframes of each frame of a television picture;

a first discrete cosine transformer means for computing the discrete cosine transform in one dimension of each said subframe;

first buffer memory means connected to said first transformer means for writing discrete cosine transform coefficients of each said subframe in a predetermined writing pattern and for reading said written coefficients in a second predetermined pattern which differs from said first predetermined writing pattern;

second discrete cosine transformer means connected to receive said read coefficients from said first buffer memory means, for computing the discrete cosine transform of each said subframe in a second dimension relative to the dimension followed by said first cosine transformer;

first diagonalization memory means connected to said second transformer means for writing discrete cosine transform coefficients put out by said second transformer means in a third predetermined pattern and for reading said written coefficients in a fourth predetermined pattern;

normalization multiplier means connected to said diagonalization memory means for multiplying the coefficients read in said fourth pattern therefrom by a normalization factor which includes an automatically variable feedback control component and a predetermined compression component and for putting out the product resulting therefrom;

encoder means connected to said normalization multiplier means for Huffman encoding the amplitude of said normalized coefficients of said product and for run length encoding of zero magnitude coefficients between coefficients greater than zero;

compressor rate buffer memory means connected to said encoder means and having a feedback connection to said normalization multiplier means, for writing said coded coefficients from said encoder means at a high asynchronous rate, for supplying said normalization multiplier means with said feedback control component which is a function of the instantaneous quantity of data in said rate buffer memory in relation to the capacity thereof, and for reading out said coded coefficients at a predetermined lower synchronous rate than as asynchronously received from said encoder means and written therein, an output connected to said compressor rate buffer memory means and to said limited bandwidth medium; and an expander comprising:

an expander input connected to said limited bandwidth medium to receive said synchronously sent coded coefficients;

expander rate buffer memory means connected to said expander input for writing said synchronously received coded coefficients at said predetermined transmission rate, for reading out said written coefficients at a higher asynchronous rate and for supplying an automatically variable feed forward control component which is a function of the instantaneous quantity of data in said memory in relation to the capacity thereof;

decoder means connected to said expander rate buffer memory means for decoding said Huffman and run length coded coefficients;

inverse normalization multiplier means connected to said decoder means and to said expander rate buffer memory means for multiplying said decoded coefficients by an inverse of said normalization factor which includes said automatically variable feed forward control component and the inverse of said predetermined compression component, and for putting out the product resulting therefrom;

second diagonalization memory means connected to said inverse normalization multiplier means for writing said coefficients received therefrom in a fifth predetermined pattern and for reading out said coefficients in a sixth predetermined pattern;

first inverse discrete cosine transformer means connected to said second diagonalization memory means for computing the inverse discrete cosine transform of said coefficients in said sixth pattern;

second buffer memory means connected to said first inverse cosine transformer means for writing said inversely transformed coefficients in a seventh predetermined pattern;

second inverse discrete cosine transformer means connected to said second buffer memory means for computing the inverse cosine transform for said coefficients read in said eighth pattern and for putting out reconstituted digitalized data of each subframe in the same line scan format as received at the input of said compressor.

4. A data compression system for coding, transferring, and decoding a stream of data coefficients in which some of said coefficients are of zero magnitude, said system comprising a compressor and an expander connected to the compressor through a communications path, said compressor including:

normalization multiplier means for multiplying said data coefficients by a normalization factor which includes an automatically variable feedback control component and a predetermined compression component and for putting out the product resulting therefrom;

encoder means connected to said normalization multiplier means for Huffman coding the amplitude of said normalized coefficients of said product and for run length coding zero magnitude coefficients between coefficients greater than zero;

compressor rate buffer memory means connected to said encoder means and having a feedback connection to said normalization multiplier means, for writing said coded coefficients from said encoder means at a high asynchronous rate, for supplying said normalization multiplier means with said feedback control component which is a function of the instantaneous quantity of data in said memory in relation to the capacity thereof, and for reading out to said communications path said coded coefficients at a predetermined low synchronous transmission rate, said expander including:

expander rate buffer memory means having an input connected to said communications path, for writing said synchronously sent coded coefficients at said predetermined rate, for reading out said written coefficients at a high asynchronous rate and for supplying an automatically variable feed forward control component which is a function of the instantaneous quantity of data in said memory in relation to the capacity thereof;

decoder means connected to said expander rate buffer memory means for decoding said Huffman and run length coded coefficients;

inverse normalization multiplier means connected to said decoder means and to said expander rate buffer memory means for multiplying said decoded coefficients by a predetermined inverse normalization factor which includes said automatically variable feed forward control component and an inverse of said predetermined compression component, and for putting out the product resulting therefrom as a stream of reconstituted data coefficients.

5. The data compression system for coding and decoding data coefficients set forth in claim 4 wherein said decoder means comprises a finite instantaneous decoder which determines each finite state from its last state and the new bit received, until a terminal state corresponding to a Huffman code is detected whereupon said Huffman code is decoded.

6. The data compression system for coding and decoding data coefficients set forth in claim 5 wherein said decoder comprises:

a serial data input, read only memory means connected to said input, for implementing a predetermined series of finite states, some of which are terminal states reachable only through other intermediate states, data latch means connected to said read only memory means, for latching the state put out by said read only memory means and for feeding said latched state output back to said read only memory means as a partial address to the next state, said next state address being completed with the next data bit received at said input, first in first out buffer memory means connected to said read only memory means, for storing each said terminal state reached in said read only memory means, and for putting out said stored terminal states as decoded coefficients at a predetermined data rate.

7. The data compression system set forth in claim 6 wherein said decoder further comprises zero run length code decoder means for decoding run length of zero coefficients, zero coefficient generation means connected to said zero run length code decoder means for generating zero value coefficients, output selector means connected to said first in first out buffer memory means and to said zero coefficient generator means for selecting real value coefficients and zero value coefficients to provide decoding of said coefficients.

* * * * *